US008913794B2

(12) United States Patent
Sato

(10) Patent No.: US 8,913,794 B2
(45) Date of Patent: Dec. 16, 2014

(54) IMAGE PROCESSING APPARATUS, IMAGE PROCESSING METHOD, AND MEDIUM

(75) Inventor: Yosuke Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 13/460,125

(22) Filed: Apr. 30, 2012

(65) Prior Publication Data

US 2012/0281882 A1 Nov. 8, 2012

(30) Foreign Application Priority Data

May 2, 2011 (JP) ................................. 2011-103218

(51) Int. Cl.
G06K 9/00 (2006.01)
H04N 5/14 (2006.01)

(52) U.S. Cl.
CPC ..................................... H04N 5/144 (2013.01)
USPC ............................ 382/107; 382/300; 348/699

(58) Field of Classification Search
None
See application file for complete search history.

(56) References Cited

U.S. PATENT DOCUMENTS

| 6,130,705 | A  | * | 10/2000 | Lareau et al. | 348/144 |
|---|---|---|---|---|---|
| 6,219,436 | B1 | * | 4/2001 | De Haan et al. | 382/107 |
| 6,377,621 | B2 | * | 4/2002 | Borer | 375/240 |
| 7,667,778 | B2 | * | 2/2010 | Yoshiwara | 348/699 |
| 7,822,231 | B2 | * | 10/2010 | Coimbra et al. | 382/107 |
| 7,961,954 | B2 | * | 6/2011 | Rohaly | 382/209 |
| 8,204,124 | B2 | * | 6/2012 | Okada et al. | 375/240.16 |
| 8,254,439 | B2 | * | 8/2012 | Lin et al. | 375/240 |
| 8,374,465 | B2 | * | 2/2013 | Mertens | 382/300 |
| 8,447,126 | B2 | * | 5/2013 | Chen et al. | 382/236 |
| 8,515,134 | B2 | * | 8/2013 | Barenbrug et al. | 382/107 |
| 8,526,680 | B2 | * | 9/2013 | Doida | 382/107 |
| 8,537,283 | B2 | * | 9/2013 | Tran et al. | 348/699 |
| 2004/0022419 | A1 | * | 2/2004 | Kesaniemi | 382/107 |
| 2009/0196567 | A1 | * | 8/2009 | Sugimoto et al. | 386/46 |
| 2011/0249870 | A1 | * | 10/2011 | Cheng et al. | 382/107 |
| 2011/0286635 | A1 | * | 11/2011 | Nishigaki | 382/107 |
| 2014/0016829 | A1 | * | 1/2014 | Chen | 382/107 |

FOREIGN PATENT DOCUMENTS

JP 3577354 A 10/2004

* cited by examiner

Primary Examiner — Chan Park
Assistant Examiner — Iman K Kholdebarin
(74) Attorney, Agent, or Firm — Canon USA Inc. IP Division

(57) ABSTRACT

When first input image and second input image are input to generate an interpolated image, based on search basis position of the interpolated image, correlation between a block based on the first image as reference and a block based on the second input image as reference is acquired to calculate a motion vector.

8 Claims, 15 Drawing Sheets

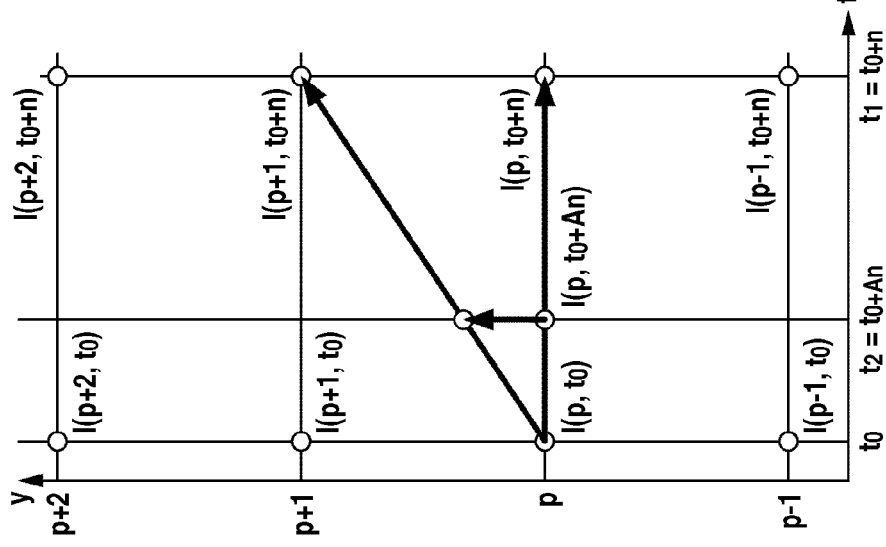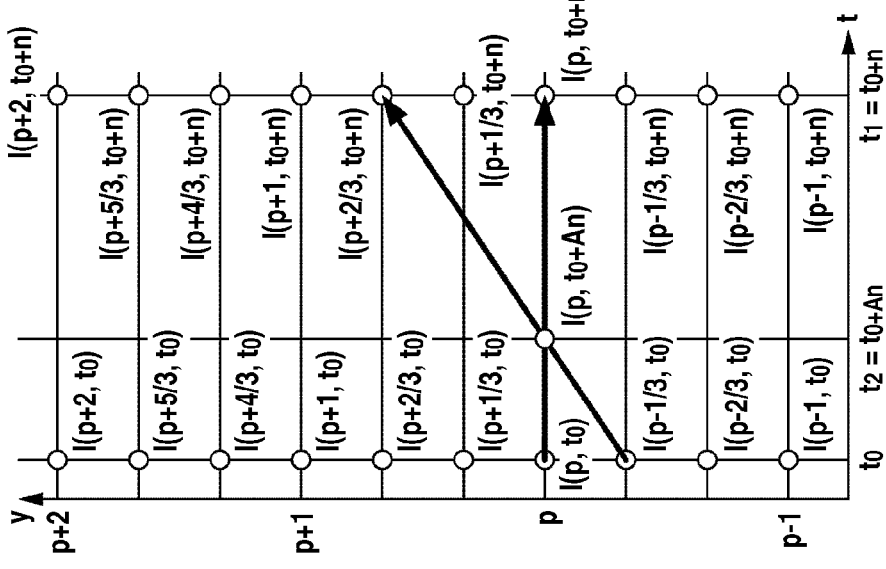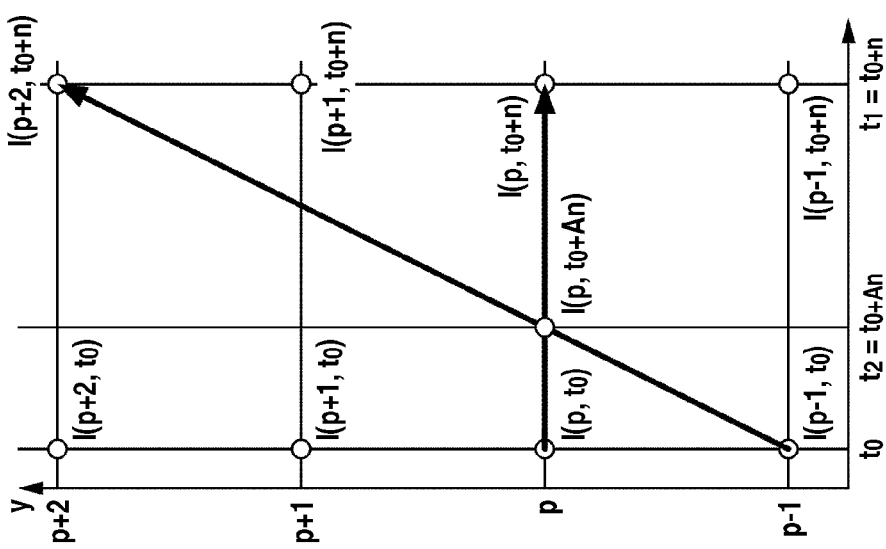

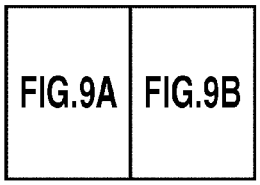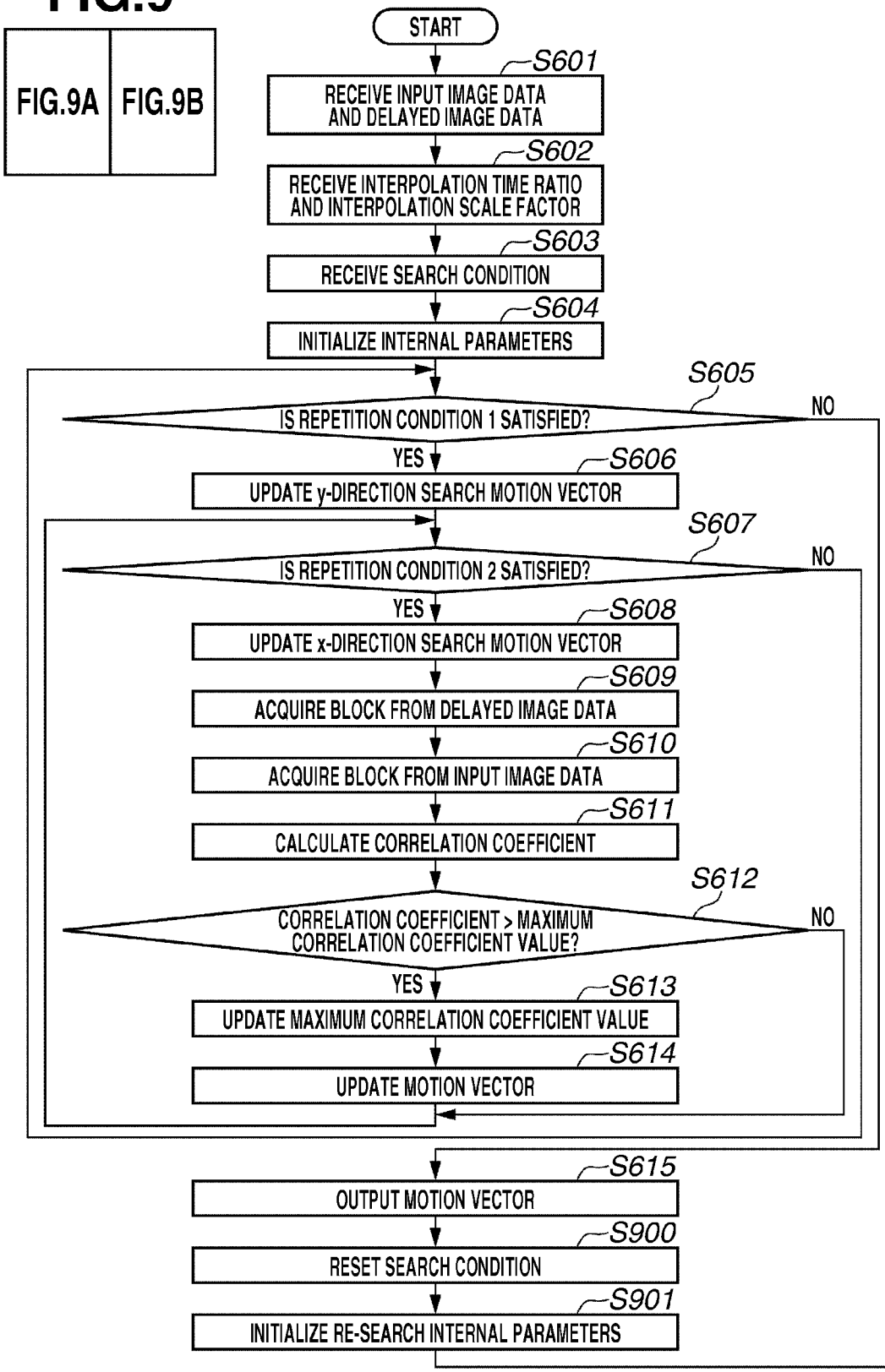

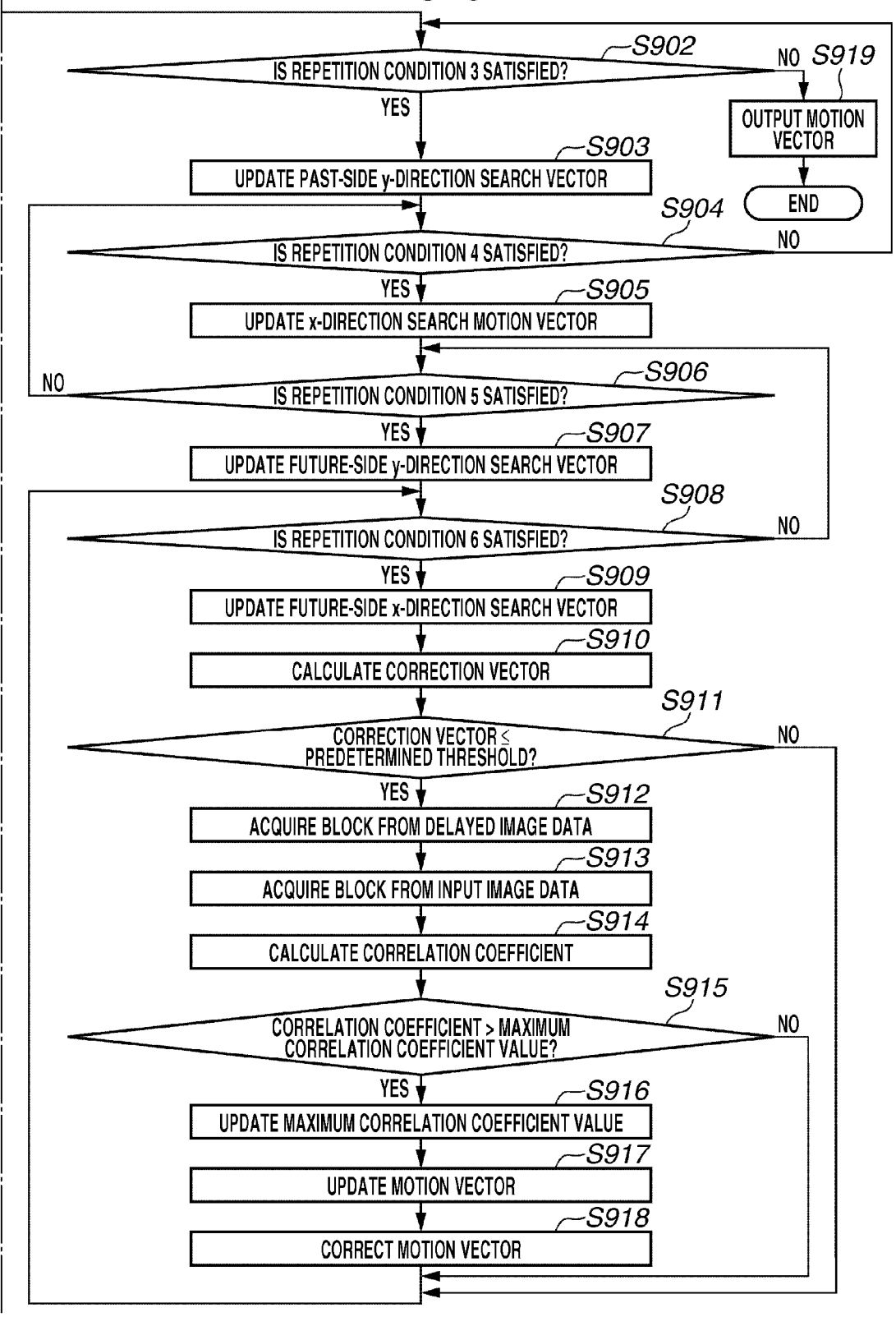

IMAGE PROCESSING APPARATUS, IMAGE PROCESSING METHOD, AND MEDIUM

BACKGROUND OF THE INVENTION

1. Field of the Invention

The present invention relates to a technology for generating interpolated image data based on input image data and delayed image data.

2. Description of the Related Art

Conventionally, motion detection technology and motion compensation technology are known as technology for executing frame rate conversion of input image data (for example, Japanese Patent No. 3,577,354). The motion detection technology detects a motion vector using a plurality of continuous image data pieces. The motion compensation technology generates interpolated image data using a motion vector.

However, the conventional technology is applicable only to double frame rate conversion, but not to any multiple-fold frame rate conversion. Namely, when the conventional technology is applied to 24 Hz video content, 48 Hz video content is output. This output does not match 60 Hz or 120 Hz, which is the refresh rate of a standard display device such as a digital television. Therefore, the problem with the conventional technology is that the technology is applicable only when the frame rate of video content is ½ of the refresh rate of a display device.

Another problem is that the motion vector search accuracy achieved by the motion detection processing of the conventional technology is low. This results in the deterioration of the image quality of interpolated image data generated during the motion compensation processing, making the viewing user feel uncomfortable.

SUMMARY OF THE INVENTION

In view of the foregoing, the present invention is directed to the implementation of any multiple-fold frame rate conversion processing and high-accuracy motion vector search.

The present invention provides an image processing apparatus capable of calculating a motion vector for generating interpolated image data between input image data and delayed image data at a third time based on input image data received at a first time and delayed image data received at a second time that is earlier than the first time by a predetermined frame time, the interpolated image data generated the third time being earlier than the first time by a time shorter than the predetermined frame time.

One aspect of the present invention provides an image processing apparatus including: a first acquisition unit configured to acquire a first block from the input image data and a second block from the delayed image data wherein, based on a reference position in the input image data corresponding to a reference position defined in the interpolated image data, the first block is at a position determined by multiplying a first time ratio by a first variable, the first time ratio being a value generated by dividing a first difference value by the predetermined frame time, the first difference value being a value generated by subtracting the third time from the first time, the first variable indicating a space deviation amount and wherein, based on a reference position in the delayed image data corresponding to the reference position defined in the interpolated image data, the second block is at a position determined by multiplying a second time ratio by the first variable, the second time ratio being a value generated by dividing a second difference value by the predetermined frame time, the second difference value being a value generated by subtracting the second time from the third time; a first calculation unit configured to calculate a correlation between the first block and the second block acquired by the first acquisition unit; and a second calculation unit configured to calculate a motion vector in the interpolated image data based on the first variable determined when the first block and the second block, whose correlation calculated by the first calculation unit satisfies a predetermined condition, are acquired.

The present invention enables any multiple-fold frame rate conversion processing and ensures high-accuracy motion vector search.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A, 7B and 7C are diagrams illustrating the problems with the search accuracy of the motion vector detection processing described with reference to sub-flowchart (1) in FIG. 6 as well as the improvement method.

FIG. 9, which includes FIGS. 9A and 9B, is a flowchart illustrating details of the motion vector detection processing in step S204 in FIG. 2.

DESCRIPTION OF THE EMBODIMENTS

Various exemplary embodiments, features, and aspects of the invention will be described in detail below with reference to the drawings.

Figure 1:
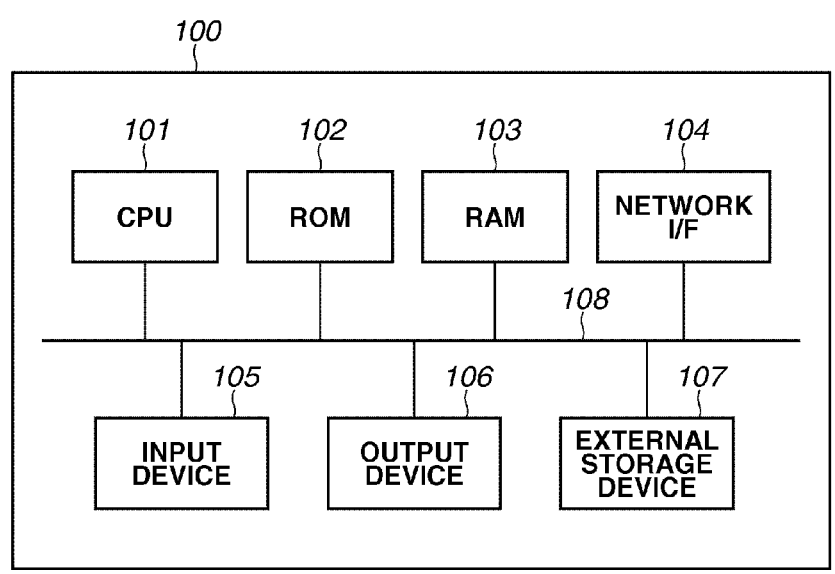
FIG. 1 is a diagram illustrating an example of a hardware configuration of an image processing apparatus in an exemplary embodiment of the present invention.

First, the following describes a first exemplary embodiment of the present invention. FIG. 1 is a diagram illustrating an example of a hardware configuration of an image processing apparatus in a first exemplary embodiment of the present invention. FIG. 1 illustrates an image processing apparatus 100. A Central Processing Unit (CPU) 101 executes an Operating System (OS) and application programs, such as a motion detection/motion compensation program, to control the image processing apparatus 100. The OS and the application programs are stored in an external storage device (hard disk) 107. The CPU 101 also controls temporary storage of information and files, necessary for program execution, in a Random Access Memory (RAM) 103. A Read Only Memory (ROM) 102 stores programs such as basic Input/Output (I/O) programs and the like. The RAM 103 functions as main memory and work areas of the CPU 101.

A network interface (I/F) 104 acts as an interface for communication with an external device via a Local Area Network (LAN) or a Wide Area Network (WAN). An input device 105 may include a mouse and a keyboard that accept input from a user as well as an image pickup apparatus that shoots an object and then receives the image data of the object. The image processing apparatus 100, when equipped with the image pickup apparatus, may function as a digital camera or a digital video camera.

An output device 106 is a display device such as a liquid crystal display. The external storage device 107 stores programs such as application programs, driver programs, OS, control programs, and programs that execute the processing of the exemplary embodiment described below. Data in the image processing apparatus 100 flows through a system bus 108. The above described example of a hardware configuration of the image processing unit shown in FIG. 1, as further described below, may function as a first acquisition unit, a second acquisition unit, a third acquisition unit, a first calculation unit, a second calculation unit, an enlargement unit, an update unit, and a generation unit.

Figure 2:
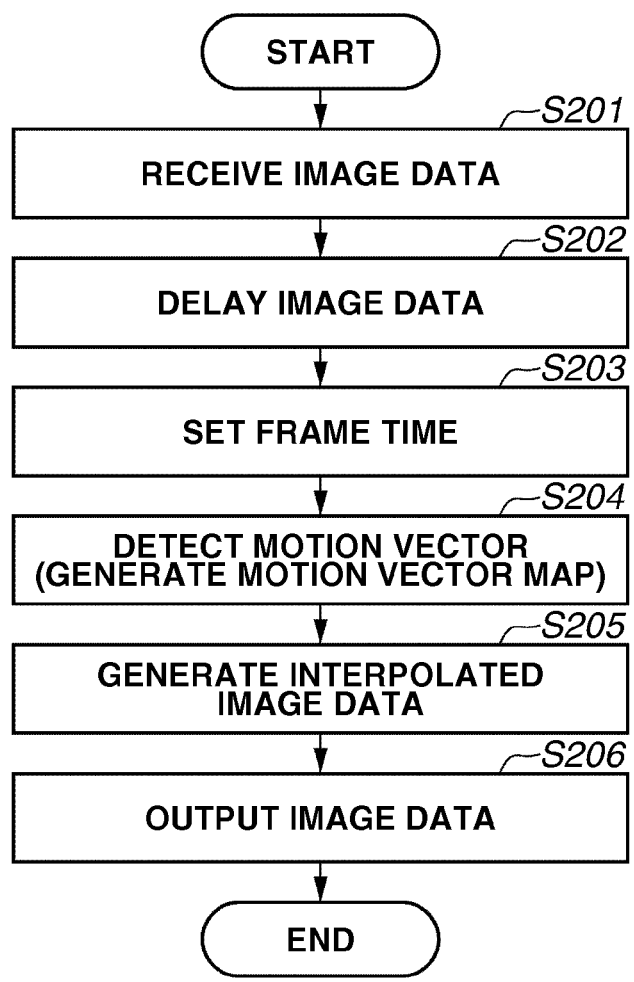
FIG. 2 is a flowchart illustrating flow of processing implemented when a CPU executes a motion detection/motion compensation program.

FIG. 2 is a flowchart illustrating the flow of processing implemented when the CPU 101 executes the motion detection/motion compensation program. The motion detection/motion compensation program may be recorded on the external storage device 107. When starting the processing, the CPU 101 reads the motion detection/motion compensation program from the external storage device 107 and expands the program in the RAM 103. Referring to FIG. 2, the following describes the flow of the processing executed based on the motion detection/motion compensation program.

In step S201, the CPU 101 receives image data. Because image data is processed later in units of frames, the CPU 101 receives image data usually in units of frames. Image data is a set of pixel data defined in the YUV color space. The bit precision per image data pixel is 8 bits for each of YUV, and the bit range is 0 to 255 (positive value only). The pixel data size of one piece of image data is 1920 pixels in the x direction and 1080 pixels in the y direction.

In step S202, the CPU 101 delays the image data, received in step S201, for one-frame time. This is because two or more frames of image data are used for the motion vector detection processing. The storage area of the image data is provided in the RAM 103 in FIG. 1 to allow the CPU 101 to delay the image data.

In the description below, the image data received in step S201 is called input image data unless otherwise noted. Also, image data, delayed for one-frame time in step S202, is called delayed image data.

Figure 3:
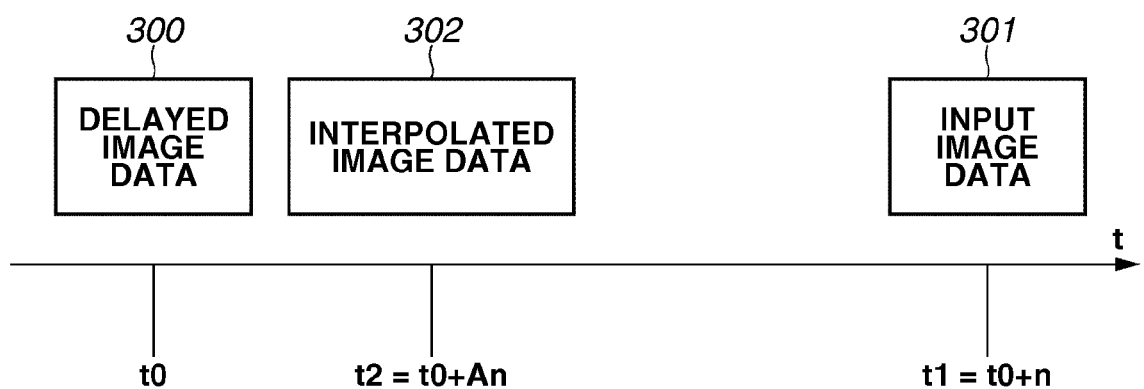
FIG. 3 is a diagram schematically illustrating the frame time of input image data, delayed image data, and interpolated image data.

In step S203, the CPU 101 sets the frame time of interpolated image data to be created based on the motion vector. The following describes step S203 in detail with reference to FIG. 3, which is a diagram schematically illustrating the frame time of input image data, delayed image data, and interpolated image data. In FIG. 3, the frame time of delayed image data 300 is $t=t_0$ (third time). The frame time of input image data 301 is $t=t_1=t_0+n$ (first time). The frame time of interpolated image data 302 is $t=t_2=t_0+An$ (second time). Note that A is set so that the interpolated image data 302 is temporally interpolated between the delayed image data 300 and the input image data 301. A is the interpolation time ratio in the range 0<A<1. In the present exemplary embodiment, two frames of interpolated image data 302 are generated between the delayed image data 300 and the input image data 301 by setting A=1/3 and 2/3. Because the same processing procedure is used for any interpolation time ratio A, A=1/3 is used in the subsequent processing description of steps S204 and S205. In the description of step S206, two frames of interpolated image data 302 are assumed to be generated for A=1/3 and A=2/3.

Because two frames of interpolated image data 302 are generated for one frame of input image data 301 in the present exemplary embodiment, the information amount is tripled. Therefore, the interpolation scale factor B=3 is defined. In the present exemplary embodiment, it is assumed that the interpolation time ratio A and the interpolation scale factor B are recorded in the motion detection/motion compensation program as a part of the program.

In step S204, the CPU 101 generates the motion vector map MV_MAP (p, q). Before describing the processing in step S204, the following gives an additional description of the motion vector map MV_MAP (p, q) and the motion vector MV(x, y, $\Delta$x, $\Delta$y). Motion vector map MV_MAP (p, q) is a set of motion vectors MV(x, y, $\Delta$x, $\Delta$y). In the present exemplary embodiment, the number of elements of the motion vector map MV_MAP (p, q) (p: x-direction motion vector map pointer, q: y-direction motion vector map pointer) is calculated as follows.

In the present exemplary embodiment, the block matching method is used to detect a motion vector. The block size used as the processing unit of the motion vector detection processing is M=40 and N=40 (M: x-direction block size, N: y-direction block size). The block boundary is defined so that the neighboring blocks do not overlap, and the motion vector detection processing is performed the number of times corresponding to a value generated by dividing the image data size by the block size. When this prerequisite is given, the number of elements of the motion vector map MV_MAP (p, q) is calculated as 1920/40·1080/40=48·27=1296. The x-direction motion vector map size P=48, and the y-direction motion vector map size Q=27.

Figure 4A:
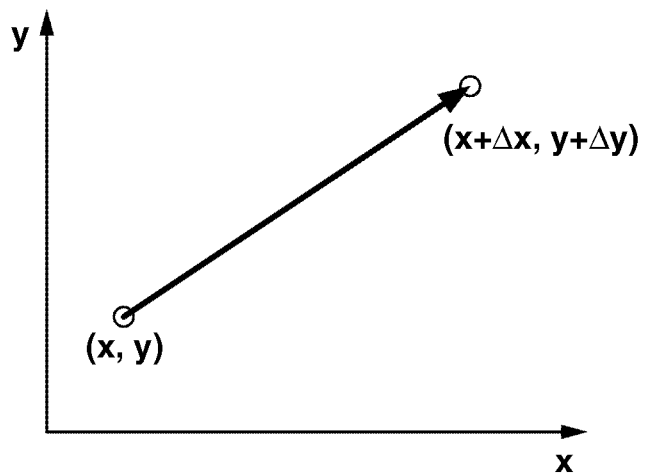
FIGS. 4A and 4B are diagrams illustrating a motion vector.
Figure 4B:
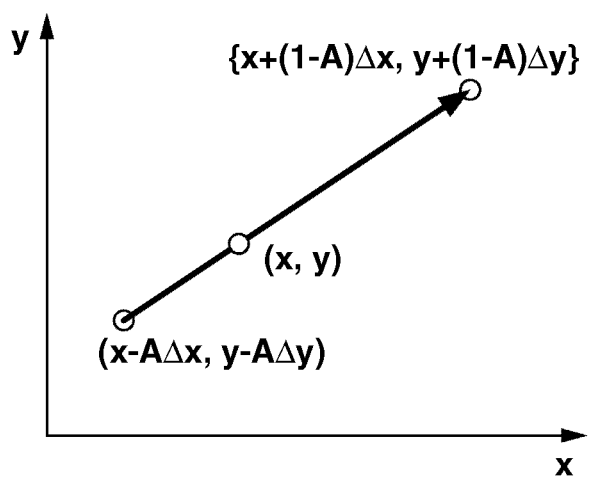

Next, the following describes a motion vector MV(x, y, $\Delta$x, $\Delta$y). In general, when the coordinate values (x, y) and the difference values ($\Delta$x, $\Delta$y) are given, the coordinate values (x, y) are defined as the starting point of the motion vector, and the coordinate values (x+$\Delta$x, y+$\Delta$y) are defined as the end point of the motion vector, as shown in FIG. 4A. However, in the present exemplary embodiment, the coordinate values (x−A$\Delta$x, y−A$\Delta$y) are defined as the starting point of the motion vector, and the coordinate values (x+(1−A)$\Delta$x, y+(1−A)$\Delta$y) are defined as the end point of the motion vector, as shown in FIG. 4B. 1−A is the first time ratio that is a value generated by dividing the first difference value generated by subtracting the third time from the first time, by the one-frame time. A is the second time ratio that is a value generated by dividing the second difference value, generated by subtracting the second time from the third time, by the one-frame time.

The same detection method is used to detect individual motion vectors MV(x, y, $\Delta$x, $\Delta$y). Therefore, the following describes the detection method for one motion vector MV(x, y, $\Delta x$, $\Delta y$) instead of describing the generation processing for the motion vector map MV_MAP(p, q).

FIG. 5 is a diagram illustrating the motion vector detection processing in step S204. The following describes the motion vector detection processing in step S204 with reference to FIG. 5.

Figure 5A:
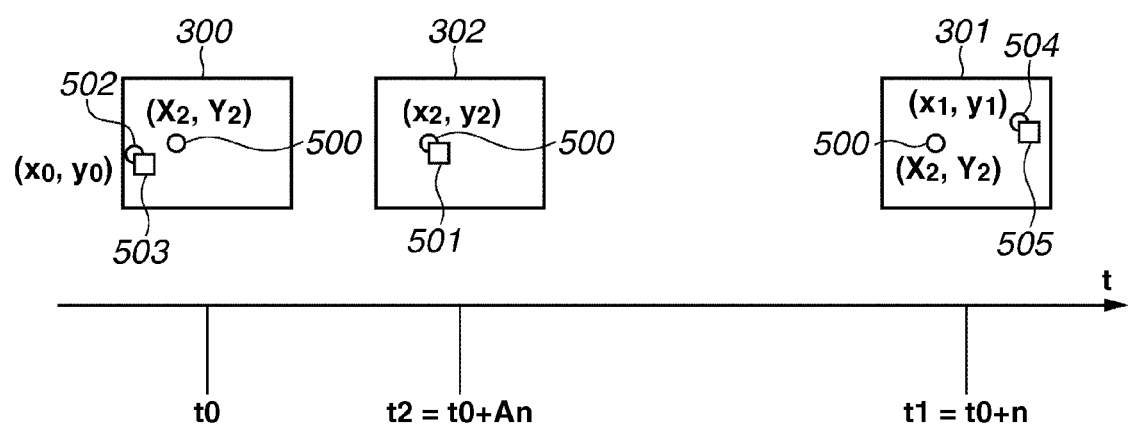
FIGS. 5A and 5B are diagrams illustrating the motion vector detection processing in step S204 in FIG. 2.

FIG. 5A illustrates the delayed image data 300 at the frame time $t=t_0$, input image data 301 at the frame time $t=t_1=t_0+n$, and interpolated image data 302 at the frame time $t=t_2=t_0+An$.

Let the coordinate values of a search reference position 500 of the interpolated image data 302 be $(x_2, y_2)$. A block 501 is defined based on the search reference position 500. In the present exemplary embodiment, the block position based on the search reference position 500 is defined in such a way that the coordinate values of the top-left of the block 501 match the search reference position 500.

Let the coordinate values of a delayed image search position 502 of the delayed image data 300 be $(x_0, y_0)$. A block 503 (second block) is defined based on the delayed image search position 502. More specifically, in the present exemplary embodiment, the block position based on the delayed image search position 502 is defined in such a way that the coordinate values of the top-left of the block 503 match the delayed image search position 502.

Let the coordinate values of an input image search position 504 of the input image data 301 be $(x_1, y_1)$. A block 505 (first block) is defined based on the input image search position 504. More specifically, in the present exemplary embodiment, the block position based on the input image search position 504 is defined in such a way that the coordinate values of the top-left of the block 505 match the input image search position 504.

As described above, the block position definition method for the block 501 using the search reference position 500, the block position definition method for the block 503 using the delayed image search position 502, and the block position definition method for the block 505 using the input image search position 504 are the same. The block size of the block 501, block 503, and block 505 is M=40 and N=40 as described above.

Figure 5B:
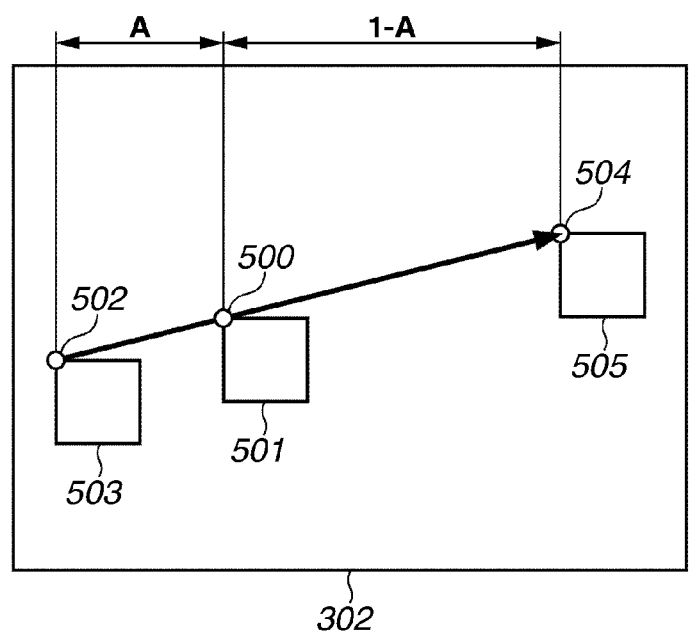

Next, the following describes the motion vector detection method in the present exemplary embodiment with reference to FIG. 5B. FIG. 5B is a diagram illustrating the state in which the delayed image search position 502, block 503, input image search position 504, and block 505 are arranged in the interpolated image data 302. One point to note here is that, in FIG. 5B, the image information in the block 503 is the delayed image data 300 and the image information in the block 505 is the input image data 301. Because three-dimensional information on time and space cannot be represented accurately on a two-dimensional paper, FIG. 5B uses the representation method as described above.

When the image information in the block 503 at the frame time $t=t_0$ is represented by the block 505 at the frame time $t=t_1=t_0+n$, it is assumed that the block 503 moves in the x direction by $\Delta x1$ and in the y direction by $\Delta y1$ during the frame time interval n. In the frame time interval An from the frame time $t=t_0$ to $t=t_2=t_0+An$, the image information in the block 503 moves in the x direction by $A\Delta x1$, and in the y direction by $A\Delta y1$. If the image information in the block 503 accurately reaches the position of the block 501 after the movement, the position can be represented as $(x_2, y_2)=(x_0+A\Delta x1, y_0+A\Delta y1)$ using the coordinate values $(x_2, y_2)$ of the search reference position 500 and the coordinate values $(x_0, y_0)$ of the delayed image search position 502. This expression is changed to $(x_0, y_0)=(x_2-A\Delta x1, y_2-A\Delta y1)$. $\Delta x1$ and $\Delta y1$ given above are second variables indicating the space deviation amount.

In the frame time interval (1−A) n from the frame time $t=t_2=t_0+An$ to $t=t_1=t_0+n$, the image information in the block 501 moves in the x direction by $A\Delta x1$, and in the y direction by $A\Delta y1$. If the image information in the block 505 is accurately in the position of the block 501 before the movement, the position can be represented as $(x_1, y_1)=\{x_2+(1-A)\Delta x1, y_2+(1-A)\Delta y1\}$ using the coordinate values $(x_2, Y_2)$ of the search reference position 500 and the coordinate values $(x_1, y_1)$ of the input image search position 504. $\Delta x1$ and $\Delta y1$ given above are first variables indicating the space deviation amount.

Block matching is then performed for the block 503 and the block 505. In this way, the motion vector MV($x_2$, $y_2$, $\Delta x1$, $\Delta y1$) of the interpolated image data 302 in the search reference position 500, whose coordinate values are $(x_2, y_2)$, at the frame time $t=t_2=t_0+An$ can be detected.

In the present exemplary embodiment, using the coordinate values in the interpolated image data 302 as the base of motion vector search, the CPU 101 detects the motion vector from the candidates of motion vectors passing through the coordinate values in the interpolated image data 302 as described above.

Figure 6:
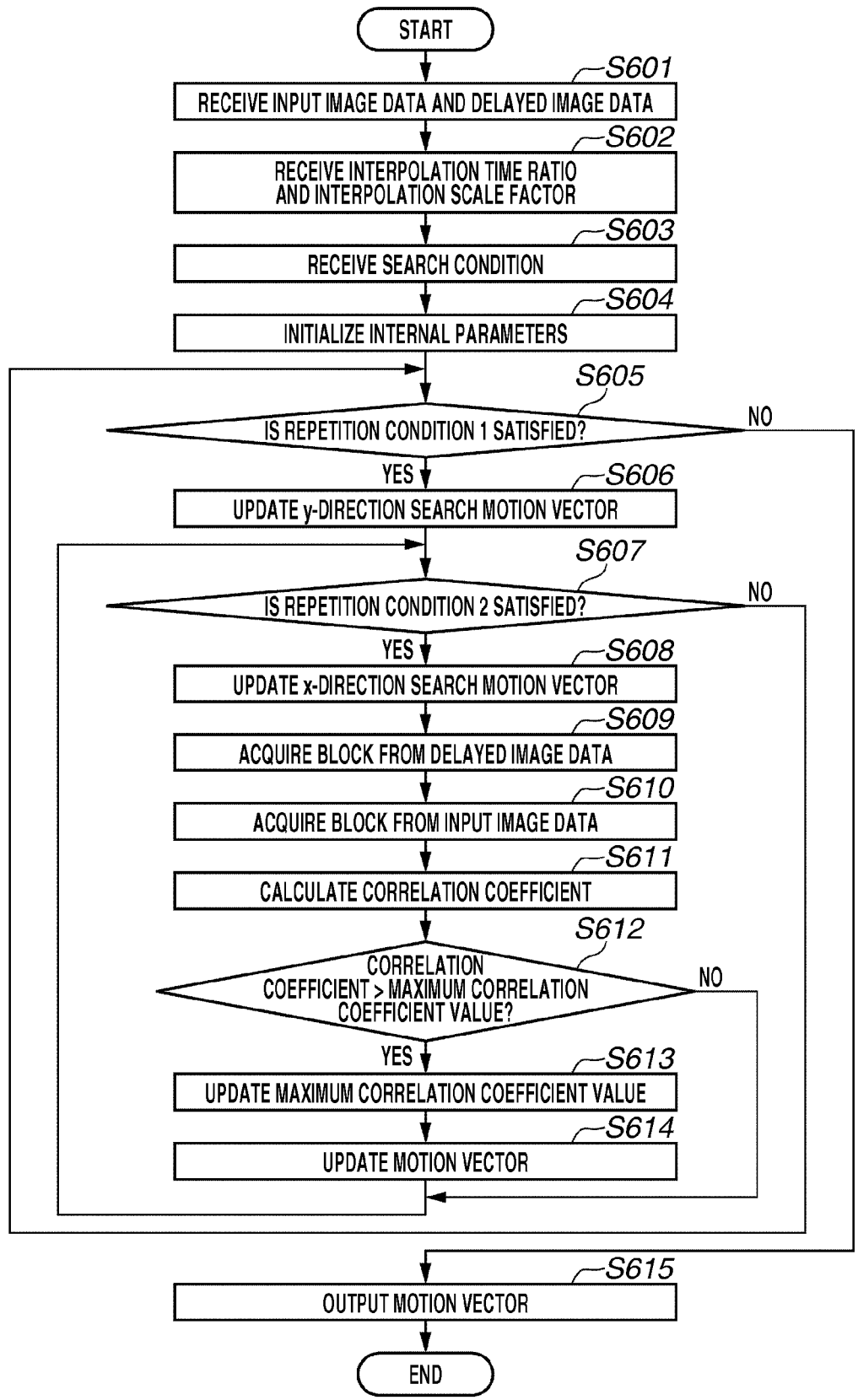
FIG. 6 is a flowchart illustrating details of the motion vector detection processing in step S204 in FIG. 2.

Next, the following describes the motion vector detection processing in step S204 in detail. FIG. 6 is a flowchart illustrating details of the motion vector detection processing in step S204 in FIG. 2. In the description below, the flowchart of the motion vector detection processing shown in FIG. 6 is called sub-flowchart (1).

In step S601, the CPU 101 receives the input image data and the delayed image data. In step S602, the CPU 101 receives the interpolation time ratio A and the interpolation scale factor B.

In step S603, the CPU 101 receives the following search condition: coordinate values $(x_2, y_2)$ of the search reference position 500, x-direction block size M, y-direction block size N, x-direction search range S_SIZE_X, and y-direction search range S_SIZE_Y. As described above, M=40 and N=40. In the present exemplary embodiment, assume that S_SIZE_X=20 and S_SIZE_Y=20.

In step S604, the CPU 101 initializes the internal parameters used in sub-flowchart (1). In the present exemplary embodiment, the internal parameters include the x-direction motion vector $\Delta x1$, y-direction motion vector $\Delta y1$, x-direction search motion vector $\Delta x0$, y-direction search motion vector $\Delta y0$, and maximum correlation coefficient value R_MAX. The internal parameters are initialized respectively as follows: $\Delta x1=0$, $\Delta y1=0$, $\Delta x0=-S\_SIZE\_X$, $\Delta y0=-S\_SIZE\_Y$, and R_MAX=0.

In step S605, the CPU 101 determines whether the y-direction search motion vector $\Delta y0$ satisfies the condition $\Delta y0 < S\_SIZE\_Y$ (repetition condition (1)). If the condition is satisfied, the processing proceeds to step S606. On the other hand, if the condition is not satisfied, the processing proceeds to step S615.

In step S606, the CPU 101 uses the interpolation scale factor B to update the y-direction search motion vector $\Delta y0$ using $\Delta y0=\Delta y0+B$. In step S607, the CPU 101 determines whether the x-direction search motion vector $\Delta x0$ satisfies the condition $\Delta x0 < S\_SIZE\_X$ (repetition condition (2)). If the condition is satisfied, the processing proceeds to step S608. On the other hand, if the condition is not satisfied, the processing proceeds to step S605.

In step S608, the CPU 101 uses the interpolation scale factor B to update the x-direction search motion vector $\Delta x0$ using Δx0=Δx0+B. In step S609, the CPU 101 acquires the block 503 from the delayed image data. The coordinate values ($x_0, y_0$) of the delayed image search position 502 of the block 503 is calculated using expression (1) given below. In step S610, the CPU 101 acquires the block 505 from the input image data. The coordinate values ($x_1, y_1$) of the input image search position 504 of the block 505 is calculated using expression (2) given below. Note that steps S609 and S610 are a processing example of a first acquisition unit.

$$(x_0, y_0) = (x_2 - A\Delta x0, y_2 - A\Delta y0) \quad (1)$$

$$(x_1, y_1) = \{(x_2 + (1-A)\Delta x0, y_2 + (1-A)\Delta y0\} \quad (2)$$

In step S611, the CPU 101 calculates the correlation coefficient R as the correlation between the block 503 and the block 505. The correlation coefficient R is calculated using expression (3) given below. In expression (3), f(x, y) is the pixel value of the position indicated by the coordinate values (x, y) in the block 503. Also, g(x, y) is the pixel value of the position indicated by the coordinate values (x, y) in the block 505. Instead of the correlation coefficient R, the Sum Absolute Difference SAD may also be calculated. The Sum Absolute Difference SAD is calculated by expression (4) given below using the block 503 and block 505. Note that step S611 is a processing example of a first calculation unit.

$$R = \frac{\sum_{m=0}^{M-1}\sum_{n=0}^{N-1} \left\{ \begin{array}{l} (f(x_0+m, y_0+n) - \overline{f(x_0, y_0)}) \\ (g(x_1+m, y_1+n) - \overline{g(x_1, y_1)}) \end{array} \right\}}{\sqrt{\sum_{m=0}^{M-1}\sum_{n=0}^{N-1}(f(x_0+m, y_0+n) - \overline{f(x_0, y_0)})^2} \sqrt{\sum_{m=0}^{M-1}\sum_{n=0}^{N-1}(g(x_1+m, y_1+n) - \overline{g(x_1, y_1)})^2}} \quad (3)$$

where $$\overline{f(x_0, y_0)} = \frac{1}{MN} \cdot \sum_{m=0}^{M-1}\sum_{n=0}^{N-1} f(x_0+m, y_0+n)$$

$$\overline{g(x_0, y_0)} = \frac{1}{MN} \cdot \sum_{m=0}^{M-1}\sum_{n=0}^{N-1} f(x_1+m, y_1+n)$$

$$SAD = \sum_{m=0}^{M-1}\sum_{n=0}^{N-1} |f(x_0+m, y_0+n) - g(x_1+m, y_1+n)| \quad (4)$$

In step S612, the CPU 101 compares the correlation coefficient R, calculated in step S611, and the maximum correlation coefficient value R_MAX. If R>R_MAX, the processing proceeds to step S613. On the other hand, if R≤R_MAX, the processing proceeds to step S607. When the Sum Absolute Difference SAD is calculated in step S611, the CPU 101 compares the Sum Absolute Difference SAD and the maximum correlation coefficient value R_MAX. If SAD≤R_MAX, the processing proceeds to step S613. On the other hand, if SAD>R_MAX, the processing proceeds to step S607.

In step S613, the CPU 101 uses the correlation coefficient R to update the maximum correlation coefficient value R_MAX using the expression R_MAX=R. If the Sum Absolute Difference SAD is calculated in step S611, the CPU 101 uses the Sum Absolute Difference SAD to update the maximum correlation coefficient value R_MAX using the expression R_MAX=SAD.

In step S614, the CPU 101 updates the x-direction motion vector Δx1 using the expression Δx1=Δx0 and, at the same time, updates the y-direction motion vector Δy1 using the expression Δy1=Δy0. In step S615, the CPU 101 outputs the motion vector MV ($x_2, y_2$, Δx1, Δy1) based on the coordinate values (x2, y2) of the search reference position 500, x-direction motion vector Δx1, and y-direction motion vector Δy1. Sub-flowchart (1) has been described. Note that step S614 is a processing example of a second calculation unit.

Next, the following describes a method for improving the search accuracy of the motion vector detection processing illustrated with reference to sub-flowchart (1) in FIG. 6. This method is carried out in the motion vector detection processing in step S204 in FIG. 2 in place of the motion vector detection processing shown in sub-flowchart (1) in FIG. 6.

FIGS. 7A-7C are diagrams illustrating the problems about the search accuracy of the motion vector detection processing described with reference to sub-flowchart (1) in FIG. 6, as well as the improvement method.

Like FIG. 5, FIGS. 7A-7C are diagrams illustrating the motion vector detection method for generating interpolated image data at the frame time $t=t_0+An$. To generate the interpolated image data, two types of image data are used: delayed image data at the frame time $t=t_0$ and the input image data at the frame time $t=t_0+n$. FIGS. 7A-7C illustrate the detection pattern of a motion vector on a pixel basis, in more detail than in FIG. 5.

Each of FIG. 7A, FIG. 7B, and FIG. 7C represents the y-t plane. In this y-t plane, the horizontal axis is the frame time and the vertical axis is the y coordinate. Although a detection pattern should be described in the three-dimensional cube using the x-y-t axes, the x-axis is omitted because the space axis may be described in one dimension using the y axis only.

In each of FIG. 7A, FIG. 7B, and FIG. 7C, the pixels I(y, t)=I(p−1, $t_0$), I(y, t)=I(p, $t_0$), I(y, t)=I(p+1, $t_0$), and I(y, t)=I(p+2, $t_0$) configuring the delayed image data 300 are arranged at the time $t=t_0$. At the time $t=t_0+n$, the pixels I(y, t)=I(p−1, $t_0+n$), I(y, t)=I(p, $t_0+n$), I(y, t)=I(p+1, $t_0+n$), and I(y, t)=I(p+2, $t_0+n$) are arranged.

The example in FIG. 7A indicates that the motion vector detection processing, described with reference to sub-flowchart (1) in FIG. 6, does not perform search with the integral-pixel accuracy and therefore the search accuracy is low. With reference to FIG. 7A, the following describes the search pattern of a motion vector wherein the pixel I(y, t)=I(p, $t_0+An$) at the frame time $t=t_0+An$ is the search reference position of motion vector detection. This pixel I(y, t)=I(p, $t_0+An$) corresponds to the search reference position 500 in the interpolated image data 302 in FIG. 5.

First, the CPU 101 uses the first search pattern to perform the first block matching wherein I(y, t)=I(p, $t_0$) is the delayed image search position and I(y, t)=I(p, $t_0+n$) is the input image search position. Next, following the first search pattern, the CPU 101 uses the second search pattern to perform the second block matching wherein I(y, t)=I(p−1, $t_0$) is the delayed image search position and I(y, t)=I(p+2, $t_0+n$) is the input image search position.

The CPU 101 calculates the shift amount of the search pixel position generated between the first block matching and the second block matching. On the delayed image data side, the shift amount is (p−1)−p=−1, meaning that the delayed image data is shifted one pixel in the negative direction of the y-axis. On the input image data side, the shift amount is (p+2)−p=2, meaning that the input image data is shifted two pixels in the positive direction of the y-axis. The difference between the shift amount of the delayed image data side and the shift amount of the input image data side is three pixels.

The difference is not one pixel corresponding to the integral-pixel accuracy. This indicates that the motion vector detection processing, described with reference to sub-flowchart (1) in FIG. 6, does not perform search with the integral-pixel accuracy and therefore the search accuracy is low.

As described above, the shift amount of the motion vector search is not 1. One reason is that the delayed image search position and the input image search position are shifted, one in the positive direction and the other in the negative direction, relative to the y-axis, using the shift amount with the integral-pixel accuracy that is larger 1. Another reason is that the CPU 101 searches only for a motion vector that passes through the search reference position.

Next, with reference to FIG. 7B, the following describes the method in which motion vector detection is performed after the image enlargement processing. With this method, motion vector detection with the integral-pixel accuracy or with the sub-pixel accuracy becomes possible. After that, with reference to FIG. 7C, the following also describes the motion vector detection method in which a pixel position, away from the original search reference position, is used as a new search reference position.

First, with reference to FIG. 7B, the following describes the method in which motion vector detection is performed after the image enlargement processing. In FIG. 7B, before motion vector detection, the image data is enlarged at the magnification equal to the interpolation scale factor B. Because the interpolation scale factor B=3 in the present exemplary embodiment, the image data is enlarged three times.

At the time $t=t_0$, the pixels $I(y, t)=I(p-1, t_0)$, $I(y, t)=I(p, t_0)$, $I(Y, t)=I(p+1, t_0)$, and $I(Y, t)=I(p+2, t_0)$ are arranged. The CPU 101 uses these pixels to generate interpolated pixels $I(y, t)=I(p-2/3, t_0)$, $I(y, t)=I(p-1/3, t_0)$, $I(y, t)=I(p+1/3, t_0)$, $I(y, t)=I(p+2/3, t_0)$, $I(y, t)=I(p+4/3, t_0)$, and $I(y, t)=I(p+5/3, t_0)$.

At the time $t=t_0+n$, the pixels $I(y, t)=I(p-1, t_0+n)$, $I(y, t)=I(p, t_0+n)$, $I(y, t)=I(p+1, t_0+n)$, and $I(y, t)=I(p+2, t_0+n)$ are arranged. The CPU 101 uses these pixels to generate interpolated pixels $I(y, t)=I(p-2/3, t_0+n)$, $I(y, t)=I(p-1/3, t_0+n)$, $I(y, t)=I(p+1/3, t_0+n)$, $I(y, t)=I(p+2/3, t_0+n)$, $I(y, t)=I(p+4/3, t_0+n)$, and $I(y, t)=I(p+5/3, t_0+n)$.

The enlargement interpolation algorithm for the image enlargement processing may be the nearest neighbor method, bi-linear interpolation method, bi-cubic interpolation method, or any other image enlargement processing.

Next, the following describes the search pattern of a motion vector using delayed image data and input image data on which the image enlargement processing has been performed. In the description below, the pixel $I(y, t)=I(p, t_0+An)$ at the frame time $t=t_0+An$ is the search reference position of the motion vector detection.

The CPU 101 uses the first search pattern to perform the first block matching wherein $I(y, t)=I(p, t_0)$ is the delayed image search position and $I(y, t)=I(p, t_0+n)$ is the input image search position. Following the first search pattern, the CPU 101 uses the second search pattern to perform the second block matching wherein $I(y, t)=I(p-1/3, t_0)$ is the delayed image search position and $I(y, t)=I(p+2/3, t_0+n)$ is the input image search position.

The CPU 101 calculates the shift amount of the search pixel position generated between the first block matching and the second block matching. On the delayed image data side, the shift amount is $(p-1/3)-p=-1/3$, which means that the delayed image data is shifted 1/3 pixel in the negative direction of the y-axis. On the input image data side, the shift amount is $(p+2/3)-p=2/3$, which means that the input image data is shifted 2/3 pixel in the positive direction of the y-axis.

The difference between the shift amount of the delayed image data side and the shift amount of the input image data side is one pixel. This indicates that the image enlargement processing performed in this way allows motion vector detection with the integral-pixel accuracy.

In the present exemplary embodiment, the interpolation scale factor B=3. If the image is enlarged three times or more, motion vector detection with the sub-pixel accuracy can be performed.

Next, with reference to FIG. 7C, the following describes the motion vector detection method in which a pixel position, away from the original search reference position, is used as a new search reference position. The motion vector detection method illustrated in FIG. 7C is performed in such a way that, after performing the motion vector detection processing according to the steps in sub-flowchart (1) in FIG. 6, the CPU 101 re-searches for a motion vector near the detected motion vector.

In FIG. 7C, to detect a motion vector at the frame time $t=t_0+An$, assume that the motion vector MV (p, 0) is detected with the pixel $I(y, t)=I(p, t_0+An)$ as the search reference position. The following description is simplified and the x-axis is not taken into consideration. However, when the x-axis is taken into consideration assuming that x-direction search reference position $x_2=40$ and x-direction motion vector $\Delta x_1=10$, the detection of the above motion vector is similar to the detection of the motion vector MV (40, p, 10, 0).

To search for a motion vector near the detected motion vector MV(p, 0), the CPU 101 defines $I(y, t)=I(p+1/3, t_0+An)$, which is shifted 1/3 pixel from the search reference position $I(y, t)=I(p, t_0+An)$, as the new search reference position. By adopting this new search reference position $I(y, t)=I(p+1/3, t_0+An)$, the CPU 101 can perform block matching wherein $I(y, t)=I(p, t_0)$ is the delayed image search position and $I(y, t)=I(p+1, t_0+n)$ is the input image search position. The motion vector passes through the new search reference position $I(y, t)=I(p+1/3, t_0+An)$.

The CPU 101 calculates the shift amount of the search pixel position arising between the first block matching, which is performed when the motion vector MV(p, 0) is detected, and the second block matching which is performed using the new search reference position $I(y, t)=I((p+1/3, t_0+An)$. On the delayed image data side, p−p=0, meaning that no shift occurs. On the input image data side, (p+1)−p=1, meaning that the input image data is shifted one pixel in the positive direction of the y-axis. The difference between the shift amount of the delayed image data side and the shift amount of the input image data side is one pixel. In this way, by detecting a motion vector with a pixel position, which is away from the original search reference position, as the new search reference position, this method allows the detection of a motion vector with the integral-pixel accuracy.

If motion vector detection is performed after the image enlargement processing as shown in FIG. 7B, motion vector detection can be performed with the integral-pixel accuracy or motion vector detection with the sub-pixel accuracy.

Alternatively, if motion vector detection is performed with a pixel position, which is away from the original search reference position, as the new search reference position as shown in FIG. 7C, motion vector detection can be performed with the integral-pixel accuracy or motion vector detection with the sub-pixel accuracy. Further, if both methods described above are performed, the same effect can be achieved.

Figure 8:
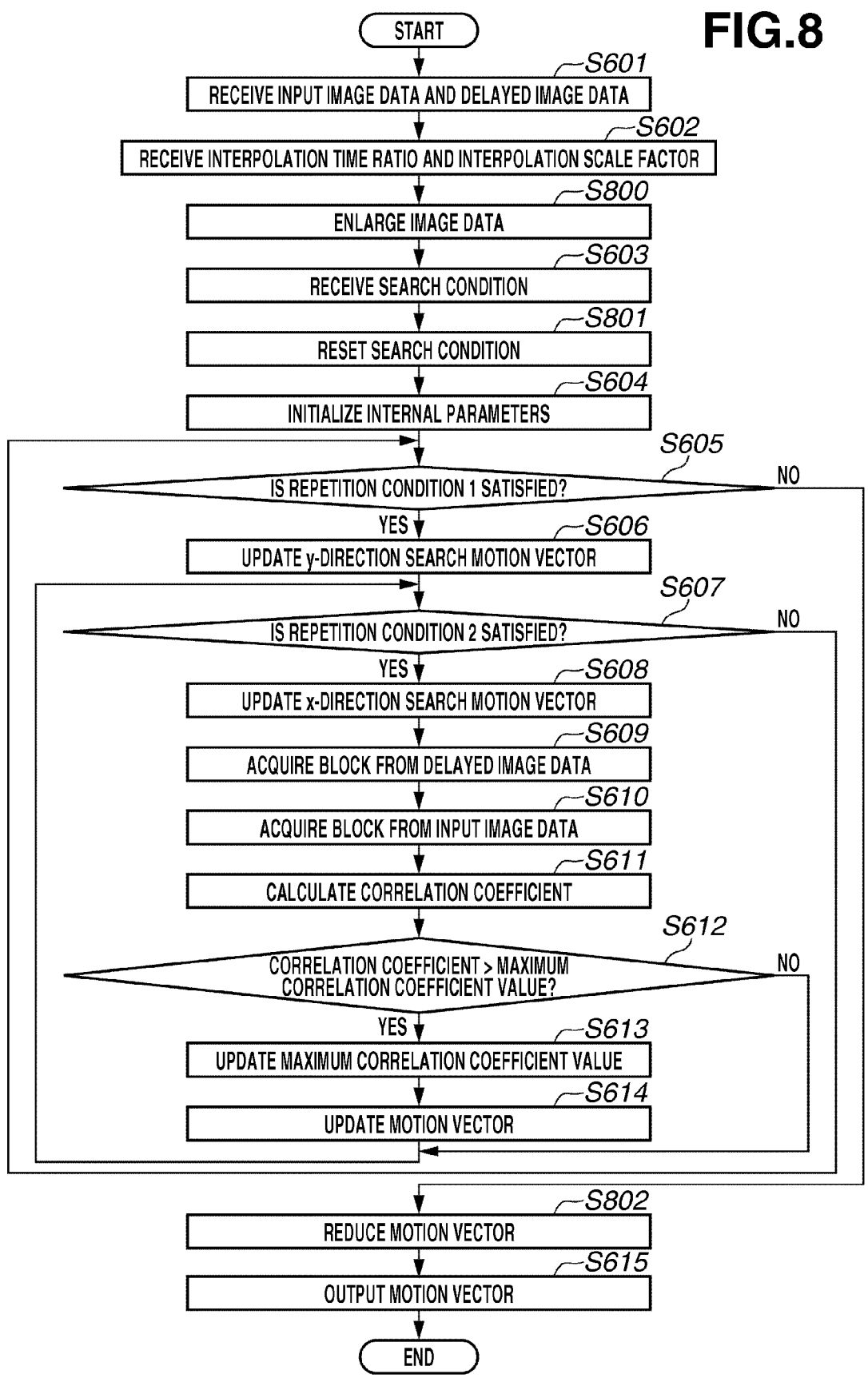
FIG. 8 is a flowchart illustrating details of the motion vector detection processing in step S204 in FIG. 2.

Next, with reference to the flowchart in FIG. 8, the following describes in detail the method for performing motion vector detection after the image enlargement processing. This is the method described above with reference to FIG. 7B. After that, the following also describes in detail the method for performing motion vector detection with a pixel position, which is away from the original search reference position, as the new search reference position. This is the method described above with reference to FIG. 7C.

FIG. 8 is a flowchart illustrating details of the motion vector detection processing in step S204 in FIG. 2. In the description below, the flowchart of the motion vector detection processing shown in FIG. 8 is called sub-flowchart (2).

The processing content of sub-flowchart (2) in FIG. 8 is similar in many points to the processing content of sub-flowchart (1) in FIG. 6. Therefore, the following describes only the processing specific to sub-flowchart (2) and omits the description of the processing similar to sub-flowchart (1). In other words, In sub-flowchart (2), the description of steps S601 to step S602, step S603, steps S604 to step S614, and steps S615 to S616 is omitted.

In step S800, the CPU 101 uses the interpolation scale factor B to enlarge the input image data and the delayed image data. Because interpolation scale factor B=3 in the present exemplary embodiment, the CPU 101 enlarges the input image data and the delayed image data three times. The method for the image enlargement processing is already described with reference to FIG. 7B and therefore the description is omitted.

In step S801, the CPU 101 resets the search condition, received in step S603, using the interpolation scale factor B. Because the interpolation scale factor B=3 in the present exemplary embodiment, the CPU 101 resets the x-direction block size M, y-direction block size N, x-direction search range S_SIZE_X, and y-direction search range S_SIZE_Y as follows: M=BM=3M, N=BN=3N, S_SIZE_X=B*S_SIZE_X=3S_SIZE_X, and S_SIZE_Y=B*S_SIZE_Y=3S_SIZE_Y.

In step S802, the CPU 101 uses the interpolation scale factor B to reduce the motion vector. Because the interpolation scale factor B=3 in the present exemplary embodiment, the CPU 101 reduces the motion vector calculated as MV ($x_2$, $y_2$, $\Delta x1$, $\Delta y1$), to $x_2=x_2/B=x_2/3$, $y_2=y_2/B=y_2/3$, $\Delta x_1=\Delta x_1/B=\Delta x_1/3$, and $\Delta y_1=\Delta y_1/B=\Delta y_1/3$. The steps of sub-flowchart (2) are executed as described above.

If motion vector detection is performed after the image enlargement processing as described above, motion vector detection can be performed with the integral-pixel accuracy. In the present exemplary embodiment, the interpolation scale factor B=3. Therefore, when an image is enlarged three times or more, motion vector detection can be performed with the sub-pixel accuracy.

With reference to the flowchart in FIG. 9, the following describes in detail the method for performing motion vector detection with a pixel position, which is away from the original search reference position, as the new search reference position. This is the method described above with reference to FIG. 7C. FIG. 9 is a flowchart illustrating details of the motion vector detection processing in step S204 in FIG. 2. In the description below, the flowchart of the motion vector detection processing is called sub-flowchart (3).

The processing content of sub-flowchart (3) in FIG. 9 is similar in many points to the processing content of sub-flowchart (1) in FIG. 6. Therefore, the following describes only the processing specific to sub-flowchart (3) and omits the description of the processing similar to sub-flowchart (1). In other words, the description of steps S601 to step S615 in sub-flowchart (3) is omitted.

In step S900, the CPU 101 resets the search condition for the x-direction search range S_SIZE_X and y-direction search range S_SIZE_Y, to S_SIZE_X=$\Delta x_1$+B and S_SIZE_Y=$\Delta y_1$+B respectively.

In step S901, the CPU 101 initializes the re-search internal parameters used in sub-flowchart (3). In the present exemplary embodiment, the re-search internal parameters are the past-side x-direction search motion vector $\Delta x00$, past-side y-direction search motion vector $\Delta y00$, future-side x-direction search motion vector $\Delta x01$, and future-side y-direction search motion vector $\Delta y01$. The CPU 101 initializes those parameters to $\Delta x00=\Delta x_1-B-1$, $\Delta y00=\Delta y_1-B-1$, $\Delta x01=\Delta x_1-B-1$, and $\Delta y01=\Delta y_1-B-1$, respectively.

In step S902, the CPU 101 determines whether the past-side y-direction search motion vector $\Delta y00$ satisfies the condition $\Delta y00<$S_SIZE_Y (repetition condition (3)). If the condition is satisfied, the processing proceeds to step S903. On the other hand, if the condition is not satisfied, the processing proceeds to step S919.

In step S903, the CPU 101 sets $\Delta y00=\Delta y00+1$ to update the past-side y-direction search motion vector $\Delta y00$. In step S904, the CPU 101 determines whether the past-side x-direction search motion vector $\Delta x00$ satisfies the condition $\Delta x00<$S_SIZE_X (repetition condition (4)). If the condition is satisfied, the processing proceeds to step S905. On the other hand, if the condition is not satisfied, the processing proceeds to step S902.

In step S905, the CPU 101 sets $\Delta x00=\Delta x00+1$ to update the past-side x-direction search motion vector $\Delta x00$. In step S906, the CPU 101 determines whether the future-side y-direction search motion vector $\Delta y01$ satisfies the condition $\Delta y01<$S_SIZE_Y (repetition condition (5)). If the condition is satisfied, the processing proceeds to step S907. On the other hand, if the condition is not satisfied, the processing proceeds to step S904.

In step S907, the CPU 101 sets $\Delta y01=\Delta y01+1$ to update the future-side y-direction search motion vector $\Delta y01$. In step S908, the CPU 101 determines whether the future-side x-direction search motion vector $\Delta x01$ satisfies the condition $\Delta x01<$S_SIZE_X (repetition condition (6)). If the condition is satisfied, the processing proceeds to step S909. On the other hand, if the condition is not satisfied, the processing proceeds to step S906.

In step S909, the CPU 101 sets $\Delta x01=\Delta x01+1$ to update the future-side x-direction search motion vector $\Delta x01$. In step S910, the CPU 101 calculates the correction vector ($\Delta x_4$, $\Delta y_4$) with the coordinate values ($x_2$, $y_2$) of the search reference position 500 as the starting point and with the coordinate values ($x_4$, $y_4$) of the new search reference position as the end point. In the calculation, the CPU 101 uses the past-side x-direction search motion vector $\Delta x00$, past-side y-direction search motion vector $\Delta y00$, future-side x-direction search motion vector $\Delta x01$, and future-side y-direction search motion vector $\Delta y01$. $x_4$ and $y_4$ are calculated respectively using $x_4=\Delta x00+A*(\Delta x01-\Delta x00)$ and $y_4=\Delta y00+A*(\Delta y01-\Delta y00)$. $\Delta x_4$ and $\Delta y_4$ are defined by $\Delta x_4=x_4-x_2$ and $\Delta y_4=y_4-y_2$, respectively.

In step S911, the CPU 101 determines whether the size of the correction vector ($\Delta x_4$, $\Delta y_4$) satisfies th2$\leq(\Delta x_4^2+\Delta y_4^2)^{1/2}$ wherein th2 is a predetermined threshold. If it is equal to or smaller than the predetermined threshold th2, the processing proceeds to step S912. On the other hand, if it is larger than the predetermined threshold th2, the processing proceeds to step S908. In the present exemplary embodiment, the predetermined threshold th2=$2^{1/2}$.

In step S912, the CPU 101 acquires a block (fourth block), whose reference position is the past-side x-direction search motion vector $\Delta x00$ and the past-side y-direction search motion vector $\Delta y00$, from the delayed image data. In step S913, the CPU 101 acquires a block (third block), whose reference position is the future-side x-direction search motion vector Δx01 and future-side y-direction search motion vector Δy01, from the input image data. Steps S912 and S913 are a processing example of a second acquisition unit.

In step S914, the CPU 101 calculates the correlation coefficient R of the two blocks acquired in step S912 and step S913. Instead of the correlation coefficient R, the Sum Absolute Difference (SAD) may also be calculated.

In step S915, the CPU 101 compares the correlation coefficient R calculated in step S914, and the maximum correlation coefficient value R_MAX. If R>R_MAX, the processing proceeds to the step S916. If R≤R_MAX, the processing proceeds to the step S908. If the SAD is calculated in step S914, the CPU 101 compares the SAD and the maximum correlation coefficient value R_MAX. If SAD≤R_MAX, the processing proceeds to step S916. If SAD>R_MAX, the processing proceeds to step S908. Note that step S916 is a processing example of a third calculation unit.

In step S916, the CPU 101 uses the correlation coefficient R to update the maximum correlation coefficient value R_MAX according to R_MAX=R. If the SAD is calculated in step S914, the CPU 101 uses the SAD to update the maximum correlation coefficient value R_MAX according to R_MAX=SAD.

In step S917, the CPU 101 uses the past-side x-direction search motion vector Δx00, past-side y-direction search motion vector Δy00, future-side x-direction search motion vector Δx01, and future-side y-direction search motion vector Δy01 to update the motion vector $MV(x_2, y_2, \Delta x_1, \Delta y_1)$. $\Delta x_1$ and $\Delta y_1$ are calculated according to $\Delta x_1 = \Delta x01 - \Delta x00$ and $\Delta y_1 = \Delta y01 - \Delta y00$ respectively.

In step S918, the CPU 101 uses the correction vector $(\Delta x_4, \Delta y_4)$ to correct the motion vector $MV(x_2, y_2, \Delta x_1, \Delta y_1)$. $\Delta x_1$ and $\Delta y_1$ are calculated according to $\Delta x_1 = \Delta x_1 - \Delta x_4$ and $\Delta y_1 = \Delta y_1 - \Delta y_4$ respectively. In step S919, the CPU 101 outputs the motion vector $MV(x_2/y_2, \Delta x_1, \Delta y_1)$. The steps of sub-flowchart (3) are executed as described above.

In this way, by detecting a motion vector with a pixel position, which is away from the original search reference position, as the new search reference position, this method, allows the detection of a motion vector with the integral-pixel accuracy. The details of the motion vector detection processing in step S204 have been described.

Sub-flowchart (1), sub-flowchart (2), and sub-flowchart (3) all show the characteristics of the present exemplary embodiment. The present exemplary embodiment is characterized in that, with the coordinate values of interpolated image data as the reference of motion vector search, a motion vector is detected from the motion vector candidates passing through the coordinate values of the interpolated image frame.

Figure 10:
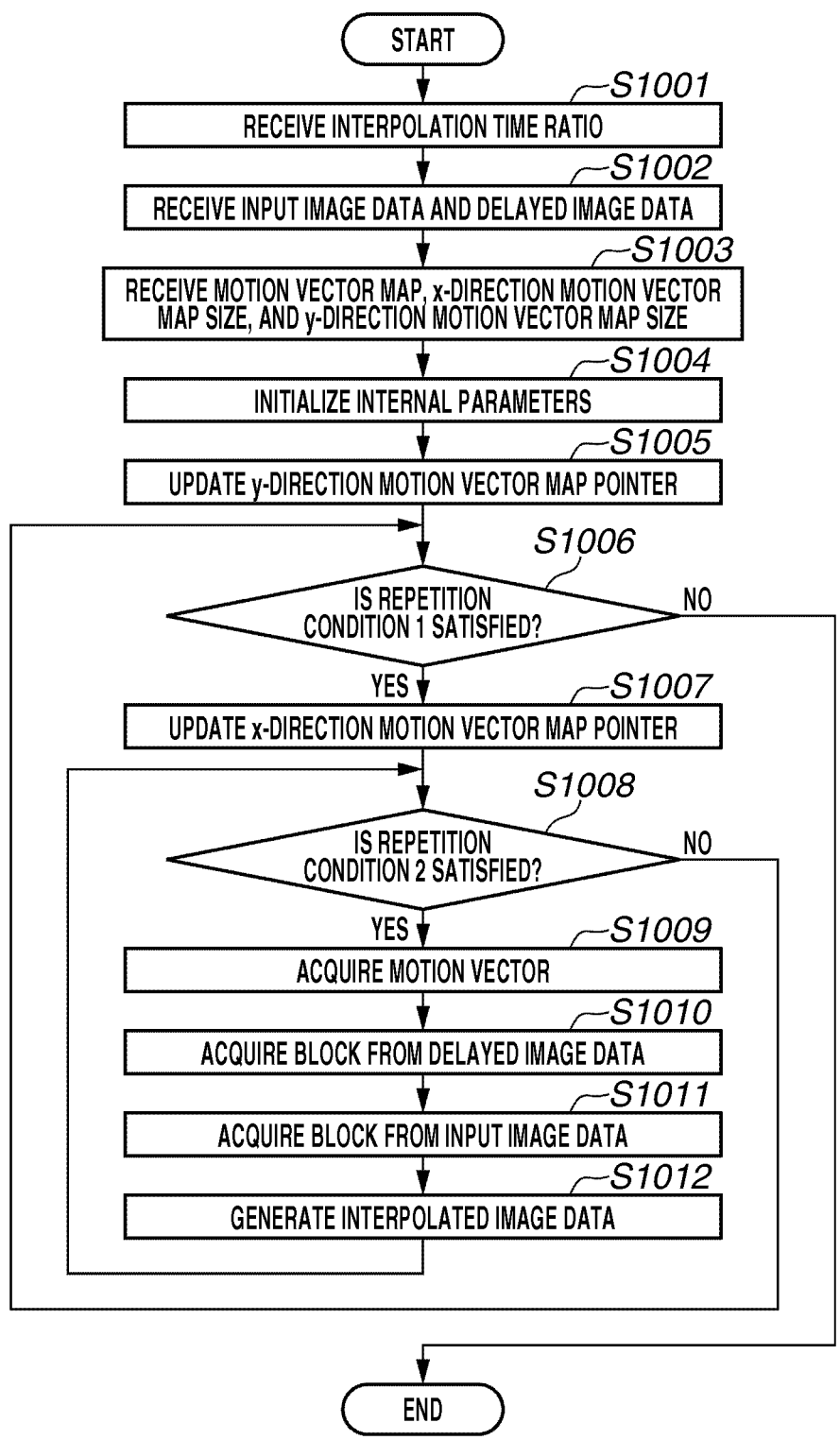
FIG. 10 is a flowchart illustrating details of the interpolated image data generation processing in step S205 in FIG. 2.

In step S205, the CPU 101 creates the interpolated image data 302 at the frame time $t=t_2=t_0+An$. The following describes details of the interpolated image data generation processing in step S205. FIG. 10 is a flowchart illustrating details of the interpolated image data generation processing in step S205 in FIG. 2. In the description below, the flowchart in FIG. 10 illustrating the interpolated image data generation processing is called sub-flowchart (4).

In step S1001, the CPU 101 receives the interpolation time ratio A. In step S1002, the CPU 101 receives the input image data and the delayed image data. In step S1003, the CPU 101 receives the motion vector map MV_MAP (p, q) detected in step S204, x-direction motion vector map size P, and y-direction motion vector map size Q.

In step S1004, the CPU 101 initializes the internal parameters used in sub-flowchart (4). In the present exemplary embodiment, the x-direction motion vector map pointer p and y-direction motion vector map pointer q are the internal parameters. These parameters are initialized as p=−1 and q=−1 respectively.

In step S1005, the CPU 101 updates the y-direction motion vector map pointer q according to q=q+1. In step S1006, the CPU 101 determines whether the y-direction motion vector map pointer q satisfies the condition q<Q (repetition condition (1)). If the condition is satisfied, the processing proceeds to step S1007. On the other hand, if the condition is not satisfied, the processing proceeds to step S1012.

In step S1007, the CPU 101 updates the x-direction motion vector map pointer p according to p=p+1. In step S1008, the CPU 101 determines whether the x-direction motion vector map pointer p satisfies the condition p<P (repetition condition (2)). If the condition is satisfied, the processing proceeds to step S1009. On the other hand, if the condition is not satisfied, the processing proceeds to step S1006.

In step S1009, the CPU 101 acquires the motion vector $MV(x_2, y_2, \Delta x_1, \Delta y_1)$ from the motion vector map MV_MAP (p, q). In step S1010, the CPU 101 acquires the block 503 (sixth block) from the delayed image data. The coordinate values $(x_0, y_0)$ of the delayed image search position 502 of the block 503 are calculated using expression (5). In step S1011, the CPU 101 acquires the block 505 (fifth block) from the input image data. The coordinate values $(x_1, y_1)$ of the input image search position 504 of the block 505 are calculated using expression (6).

$$(x_0, y_0) = (x_2 - A\Delta x1, y_2 - A\Delta y1) \tag{5}$$

$$(x_1, y_1) = \{x_2 + (1-A)\Delta x1, y_2 + (1-A)\Delta y1\} \tag{6}$$

The following is the supplementary description adapted for the motion vector $MV(x_2, y_2, \Delta x1, \Delta y1)$ used in the processing in step S1010 and step S1011.

In step S204, if motion vector detection is performed after the image enlargement processing as illustrated in the flowchart in FIG. 8, the motion vector is detected with the integral pixel accuracy or with the sub-pixel accuracy. Similarly, if motion vector is detected with a pixel position, away from the original search reference position, as the new search reference position as illustrated in the flowchart in FIG. 9, the motion vector is detected with the integral pixel accuracy or with the sub-pixel accuracy.

This means that the coordinate values $(x_0, y_0)$ of the delayed image search position 502 of the block 503 calculated using expression (5), and the coordinate values $(x_1, y_1)$ of the input image search position 504 of the block 505 calculated using expression (6), may include a decimal number. When the coordinate values $(x_0, y_0)$ and coordinate values $(x_1, y_1)$ include a decimal number, the CPU 101 uses the existing pixels to interpolate pixels at a pixel position with the decimal accuracy.

If the integer part of the x-direction motion vector Δx1 of the motion vector $MV(x_2, y_2, \Delta x1, \Delta y1)$ is represented as Δx1_int, and the decimal part as Δx1_dec, then Δx1 is represented as Δx1=Δx1_int+Δx1_dec. Similarly, if the integer part of the y-direction vector Δy1 is represented as Δy1_int, and the decimal part as Δy1_dec, then Δy1 is represented as Δy1=Δy1_int+Δy1_dec.

In this case, the interpolation pixel position $(x_5, y_5)$ is calculated as follows.

$$x_5 = (1 - \Delta x1\_dec) * \Delta x1\_int + \Delta x1\_dec * (\Delta x1\_int + 1)$$

$$y_5 = (1 - \Delta y1\_dec) * \Delta y1\_int + \Delta y1\_dec * (\Delta y1\_int + 1)$$

The supplementary description of the processing adapted for the motion vector MV($x_2$, $y_2$, $\Delta x1$, $\Delta y1$), used in step S1010 and step S1011, has been given above.

In step S1012, the CPU 101 uses the block 503 and the block 505 to generate the block (seventh block) of interpolated image data with the search reference position 500 at the coordinate values ($x_2$, $y_2$) as the reference according to expression (7). In expression (7), h(x, y) is the pixel value of the position indicated by the coordinate values (x, y) in the block 501. f(x, y) is the pixel value of the position indicated by the coordinate values (x, y) in the block 503. g(x, y) is the pixel value of the position indicated by the coordinate values (x, y) in the block 505. m and n are offset values in the range $0 \leq m < M$ and $0 \leq n < N$. The supplementary description of the processing for generating the interpolated image data 302 at the frame time $t = t_2 = t_0 + An$ in step S205 has been given above.

$$h(x_2+m, y_2+n) = (1-A) \cdot f(x_0+m, y_0+n) + A \cdot g(x+m, y_1+n) \quad (7)$$

In step S206, the CPU 101 outputs the delayed image data, the interpolated image data generated at the interpolation time ratio A=1/3, and the interpolated image data generated at the interpolation time ratio A=2/3 in this order. Sub-flowchart (4) is as described above.

As described above, according to the first exemplary embodiment, any multiple-fold frame rate conversion can be performed through the frame rate conversion processing using the motion detection technology and the motion compensation technology. This conversion cannot be attained by the prior art.

Since motion vector search can be performed with an accuracy higher than the prior art, the image quality of interpolated image data can be improved through the motion compensation processing, and best video images can be provided to the user.

The color space of image data in the first exemplary embodiment is YUV. However, the essence of the present invention is not to limit the color space of image data to YUV; more specifically, the color space may be RGB, Lab, or HSL. In addition, the bit accuracy per pixel is not limited to eight bits but may be any number of bits. Similarly, the bit range may take a negative value.

In the first exemplary embodiment, the interpolation time ratio A is recorded in the motion detection/motion compensation program as a part of the program. The essence of the present invention is not limited to the recording of the interpolation time ratio A in this way. For example, the interpolation time ratio A may be entered from the input device 105.

In the first exemplary embodiment, the number of elements of the motion vector map MV_MAP(p, q) is 1296. This is because the number of elements depends on the block size, which is a unit of processing in the motion vector detection processing. However, the essence of the present invention is not limited to this number of elements; in other words, the present invention does not always require that the number of elements of the motion vector map MV_MAP(p, q) depends on the block size, which is a unit of the processing in the motion vector detection processing. More specifically, the motion vector detection processing may be performed by setting the position of any coordinate values in the image data as the search reference position so that the motion vector map MV_MAP(p, q) having an arbitrary number of elements may be generated.

Although the block size is defined as M=40 and N=40 in the first exemplary embodiment, the essence of the present invention is not limited to this block size. M and N may be set to any value that is equal to or smaller than the image data size.

According to the block position definition method in the first exemplary embodiment in which the search reference position 500 of the block 501 is used, the block position is defined so that the coordinate values of the top left of the block 501 correspond to the search reference position 500. However, the essence of the present invention is not limited to this definition. More specifically, the block position may be defined so that the coordinate values of the center of gravity of the block 501 correspond to the search reference position 500. The block position may also be defined so that a point, which is away from the coordinate values of the center of gravity of the block 501 by a predetermined vector, corresponds to the search reference position 500. This block position definition method is applicable also to the block position definition method in which the delayed image search position 502 of the block 503 is used or to the block position definition method in which the input image search position 504 of the block 505 is used.

In the first exemplary embodiment, the search range is defined as follows; x-direction search range S_SIZE_X=20 and y-direction search range S_SIZE_Y=20. The essence of the present invention is not limited to this range. Namely, S_SIZE_X and S_SIZE_Y may be set to any value.

Figure 11:
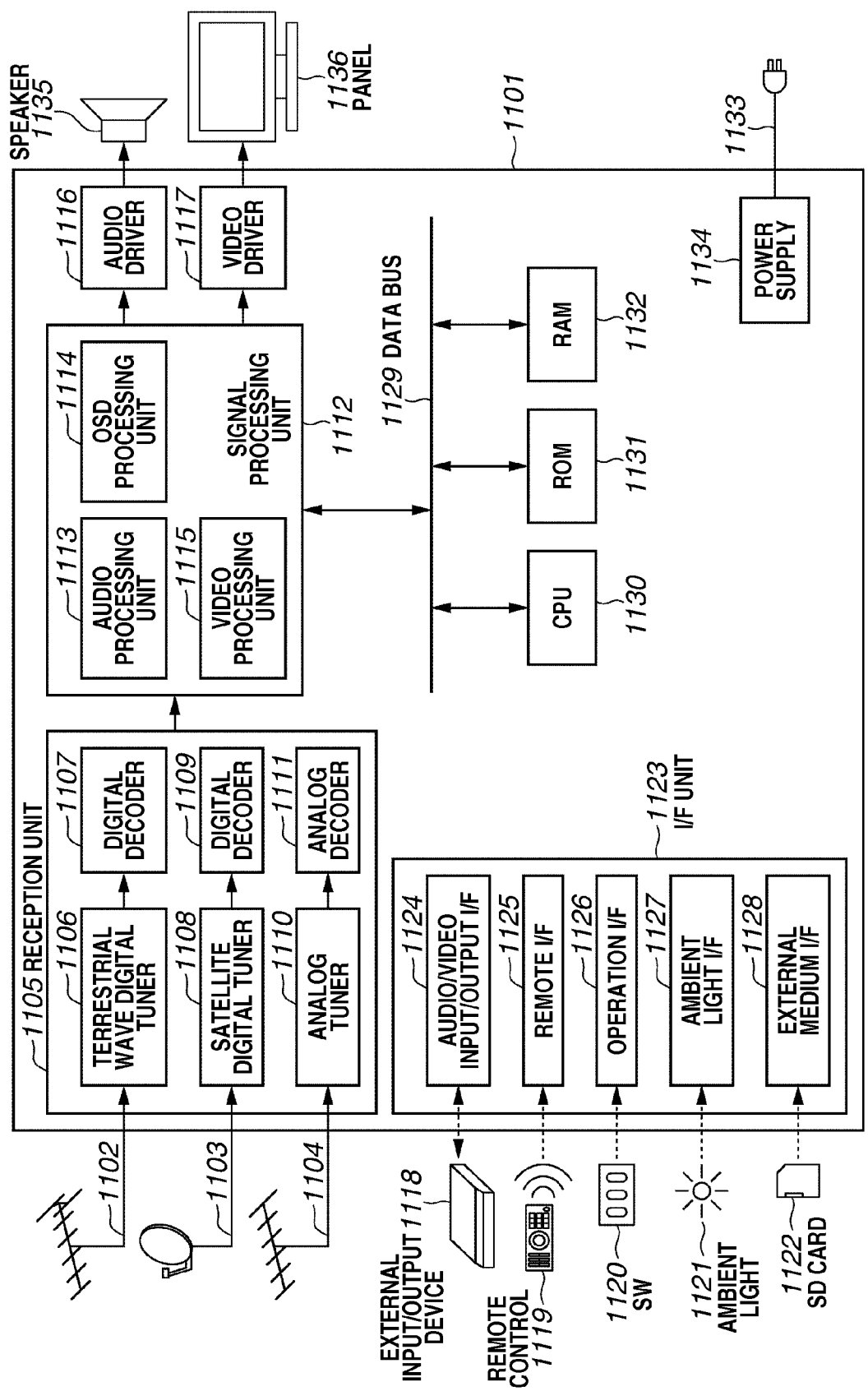
FIG. 11 is a diagram illustrating the configuration of the image processing apparatus in the exemplary embodiment of the present invention.

Next, the following describes a second exemplary embodiment of the present invention. FIG. 11 is a diagram illustrating the configuration of an image processing apparatus in the second exemplary embodiment of the present invention. The figure illustrates the exemplary embodiment in which the present invention is applied to a television set.

An image processing apparatus 1101 includes the following components. A broadcast wave is received by a terrestrial wave digital tuner 1106, a satellite digital tuner 1108, and an analog tuner 1110 of a reception unit 1105 via antennas 1102, 1103, and 1104. The received broadcast wave is decoded into an audio signal and a video signal by digital decoders 1107 and 1109 and an analog decoder 1111. An I/F unit 1123 acts as an interface to an external input/output device 1118, a remote control 1119, a switch (SW) 1120, an ambient light 1121, and an Secure Digital (SD) card 1122. The I/F unit 1123 includes an audio/video input/output I/F 1124, a remote I/F 1125, an operation I/F 1126, an ambient light I/F 1127, and an external medium I/F 1128 which correspond to the above devices. The I/F unit 1123 also acts as an interface to the input/output control signals for channel selection, volume adjustment, and image quality correction.

A signal processing unit 1112 includes an audio processing unit 1113, a video processing unit 1115, and an On-Screen Display (OSD) processing unit 1114 to perform audio, video, and OSD (on-screen display) processing. An audio driving unit 1116 outputs the audio signal from a speaker 1135 as a sound. A video driving unit 1117 displays the video signal on a panel 1136 as a moving image.

A CPU 1130 executes the programs stored in a ROM 1131, to control the image processing apparatus 1101. A RAM 1132 functions as the main memory and the work area of the CPU 1130. The CPU 1130, ROM 1131, RAM 1132, and signal processing unit 1112 are connected via a data bus 1129. A power supply 1134 supplies power from an external source via a power plug 1133.

Figure 12:
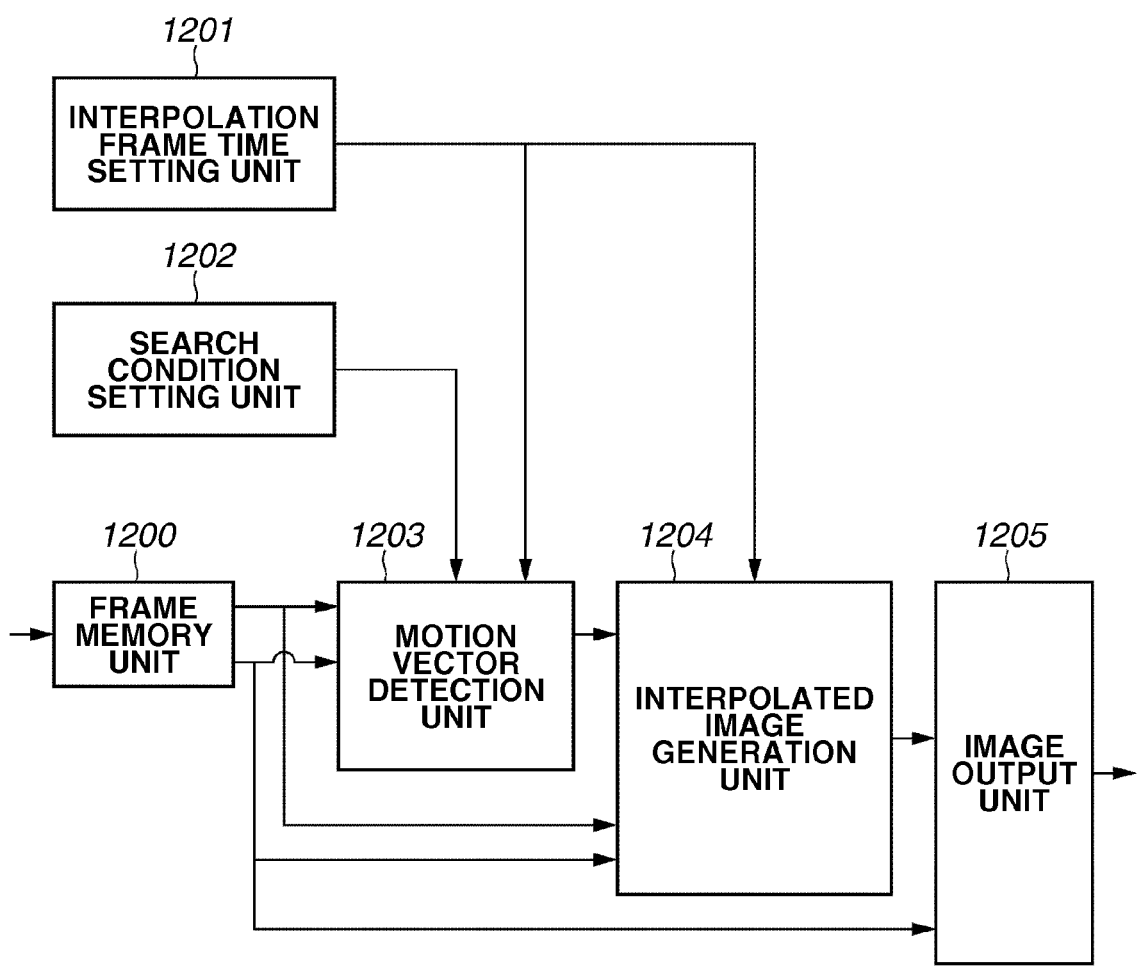
FIG. 12 is a diagram illustrating the configuration of a video processing unit.

FIG. 12 is a diagram illustrating the configuration of the video processing unit 1115. The following describes the configuration of the video processing unit 1115 with reference to FIG. 12. As to the content similar to the first exemplary embodiment, the description of the first exemplary embodiment is applicable and thus the description is omitted here.

The video processing unit 1115 includes a frame memory unit 1200, an interpolated frame time setting unit 1201, a search condition setting unit 1202, a motion vector detection unit 1203, an interpolated image generation unit 1204, and an image output unit 1205.

The frame memory unit 1200 has a memory that receives image data, one frame at a time, and holds the received image data. The frame memory unit 1200 outputs two types of image data corresponding to two different times: one is received image data and the other is image data generated in the memory by delaying the received image data by one frame time. In the description below, image data that is received and then output immediately is called input image data while image data that is delayed and then output is called delayed image data.

The interpolation frame time setting unit 1201 outputs the interpolation time ratio A and the interpolation scale factor B described in the first exemplary embodiment. In the present exemplary embodiment too, A=1/3 and 2/3 and B=3. Because the same processing procedure is applicable to any interpolation time ratio A, A=1/3 is used in the subsequent processing description of the motion vector detection unit 1203 and the interpolated image generation unit 1204.

The form for installing the interpolation frame time setting unit 1201 is not limited to the present invention. In the present exemplary embodiment, the interpolation frame time setting unit 1201 is recorded in the ROM 1131. Simultaneously with start of the image processing apparatus 1101, the interpolation frame time setting unit 1201 is read into the video processing unit 1115.

The search condition setting unit 1202 acquires the coordinate values ($x_2$, $y_2$) of the search reference position 500 in FIG. 5 described in the first exemplary embodiment. The search condition setting unit 1202 receives the x-direction block size M, y-direction block size N, x-direction search range S_SIZE_X, and y-direction search range S_SIZE_Y. As in the first exemplary embodiment, M=40, N=40, S_SIZE_X=20, and S_SIZE_Y=20.

The form for installing the search condition setting unit 1202 is not limited to the present invention. In the present exemplary embodiment, the search condition setting unit 1202 is recorded in the ROM 1131. Simultaneously with start of the image processing apparatus 1101, the search condition setting unit 1202 is read into the video processing unit 1115.

The motion vector detection unit 1203 receives the input image data and the delayed image data from the frame memory unit 1200 and, in addition, receives the interpolation time ratio A and the interpolation scale factor B from the interpolation frame time setting unit 1201. The motion vector detection unit 1203 receives the coordinate values ($x_2$, $y_2$) of the search reference position 500, x-direction block size M, y-direction block size N, x-direction search range S_SIZE_X, and y-direction search range S_SIZE_Y from the search condition setting unit 1202. The motion vector detection unit 1203 uses these values to generate the motion vector map MV_MA P(p, q).

The detection method of each motion vector MV(x, y, $\Delta x$, $\Delta y$) in the present exemplary embodiment is the same as the first exemplary embodiment. Therefore, the following describes the detection method of one motion vector MV(x, y, $\Delta x$, $\Delta y$) instead of describing the generation processing of the motion vector map MV_MAP(p, q).

Figure 13:
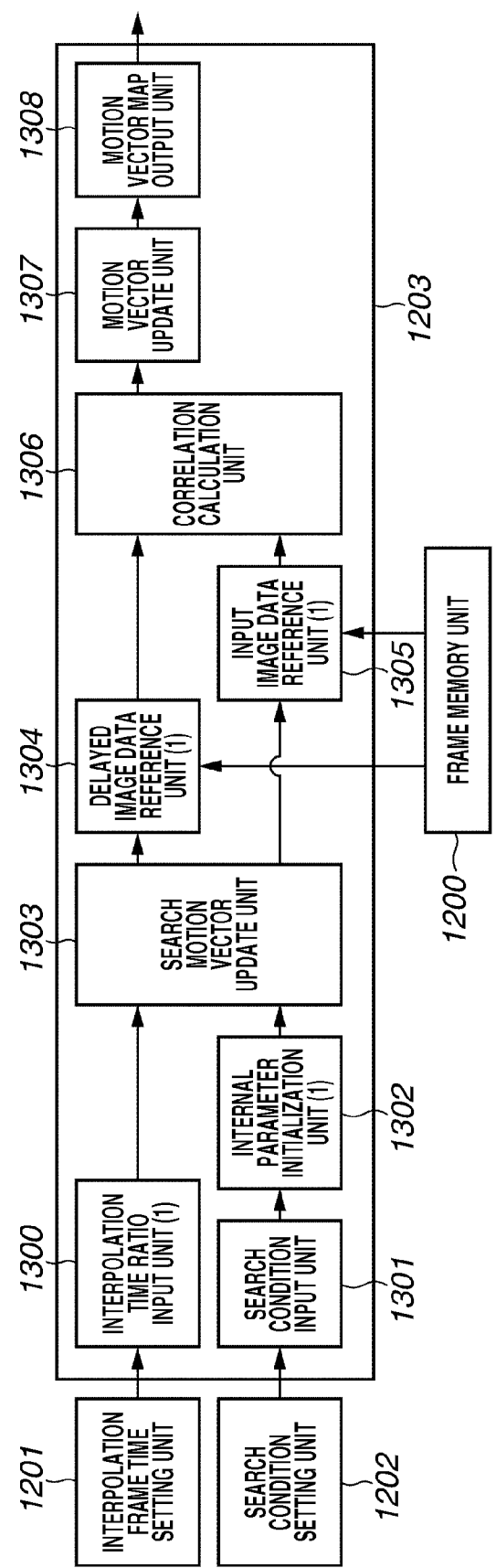
FIG. 13 is a diagram illustrating the configuration of a motion vector detection unit.

FIG. 13 is a diagram illustrating the configuration of the motion vector detection unit 1203. The following describes the configuration of the motion vector detection unit 1203 with reference to FIG. 13.

The motion vector detection unit 1203 includes an interpolation time ratio input unit (1) 1300, a search condition input unit 1301, an internal parameter initialization unit (1) 1302, a search motion vector update unit 1303, a delayed image data reference unit (1) 1304, an input image data reference unit (1) 1305, a correlation calculation unit 1306, a motion vector update unit 1307, and a motion vector map output unit 1308.

The interpolation time ratio input unit (1) 1300 receives the interpolation time ratio A and the interpolation scale factor B from the interpolation frame time setting unit 1201. The search condition input unit 1301 receives the coordinate values ($x_2$, $y_2$) of the search reference position 500, x-direction block size M, y-direction block size N, x-direction search range S_SIZE_X, and y-direction search range S_SIZE_Y from the search condition setting unit 1202.

The internal parameter initialization unit (1) 1302 initializes the internal parameters used by the motion vector detection unit 1203. In the present exemplary embodiment, the internal parameters are the x-direction motion vector $\Delta x1$, y-direction motion vector $\Delta y1$, x-direction search motion vector $\Delta x0$, y-direction search motion vector $\Delta y0$, and maximum correlation coefficient value R_MAX.

The internal parameter initialization unit (1) 1302 initializes the internal parameters as follows: $\Delta x1=0$, $\Delta y1=0$, $\Delta x0=-S\_SIZE\_X$, $\Delta y0=-S\_SIZE\_Y$, and R_MAX=0. The x-direction search range S_SIZE_X and the y-direction search range S_SIZE_Y are received from the search condition input unit 1301. The search motion vector update unit 1303 makes determination about a following condition (1) and condition (2) to update the x-direction search motion vector $\Delta x0$ and the y-direction search motion vector $\Delta y0$.

The search motion vector update unit 1303 determines whether the y-direction search motion vector $\Delta y0$ satisfies $\Delta y0<S\_SIZE\_Y$ (the condition (1)). If the condition (1) is satisfied, the search motion vector update unit 1303 uses the interpolation scale factor B to update the y-direction search motion vector $\Delta y0$ according to y0=$\Delta y0$+B. On the other hand, if the condition (1) is not satisfied, the search motion vector update unit 1303 transmits the control signal to the motion vector map output unit 1308.

If the condition (1) is satisfied, the search motion vector update unit 1303 updates the y-direction search motion vector $\Delta y0$ and, after that, determines whether the x-direction search motion vector $\Delta x0$ satisfies $\Delta x0<S\_SIZE\_X$ (condition (2)). If the condition (2) is satisfied, the search motion vector update unit 1303 uses the interpolation scale factor B to update the x-direction search motion vector $\Delta x0$ according to $\Delta x0=\Delta x0+B$. On the other hand, if the condition (2) is not satisfied, the search motion vector update unit 1303 makes determination about the condition (1) again.

The delayed image data reference unit (1) 1304 references the delayed image data stored in the frame memory unit 1200, to acquire the block 503. More specifically, the delayed image data reference unit (1) 1304 uses the x-direction search motion vector $\Delta x0$ and y-direction search motion vector $\Delta y0$ to calculate the coordinate values ($x_0$, $y_0$) of the delayed image search position 502 of the block 503 according to the expression (1) and acquires the block 503.

The input image data reference unit (1) 1305 references the input image data stored in the frame memory unit 1200, to acquire the block 505. More specifically, the input image data reference unit (1) 1305 uses the x-direction search motion vector $\Delta x0$ and y-direction search motion vector $\Delta y0$ to calculate the coordinate values ($x_1$, $y_1$) of the input image search position 504 of the block 505 according to the expression (2) and acquires the block 505.

The correlation calculation unit 1306 calculates the correlation coefficient R between the block 503 and the block 505. The correlation coefficient R is calculated using the expression (3). In the expression (3), f(x, y) is the pixel value of the position indicated by the coordinate values (x, y) in the block 503. Also, g(x, y) is the pixel value of the position indicated by the coordinate values (x, y) in the block 505. Instead of the correlation coefficient R, the Sum Absolute Difference (SAD) may also be calculated. The SAD may be calculated by the expression (4) using the block 503 and the block 505.

The motion vector update unit 1307 compares the correlation coefficient R received from the correlation calculation unit 1306, and the maximum correlation coefficient value R_MAX. If R>R_MAX, the motion vector update unit 1307 uses the correlation coefficient R to update the maximum correlation coefficient value R_MAX according to R_MAX=R.

If the correlation calculation unit 1306 calculates the SAD, the motion vector update unit 1307 compares the SAD and the maximum correlation coefficient value R_MAX. If SAD≤R_MAX, the motion vector update unit 1307 uses the SAD to update the maximum correlation coefficient value R_MAX according to R_MAX=SAD.

When the control signal is received from the search motion vector update unit 1303, the motion vector map output unit 1308 generates the motion vector MV($x_2$, $y_2$, $\Delta x1$, $\Delta y1$) from the coordinate values ($x_2$, $y_2$) of the search reference position 500, x-direction motion vector $\Delta x1$, and y-direction motion vector $\Delta y1$.

The x-direction motion vector $\Delta x1$ and y-direction motion vector $\Delta y1$ may be calculated according to $\Delta x1 = \Delta x0$ and $\Delta y1 = \Delta y0$ using the x-direction search motion vector $\Delta x0$ and y-direction search motion vector $\Delta y0$ received from the motion vector update unit 1307.

After the motion vector MV($x_2$, $y_2$, $\Delta x1$, $\Delta y1$) is generated for all blocks, the generation of the motion vector map MV_MAP(p, q) is completed. When the motion vector map MV_MAP(p, q) is generated, the motion vector map output unit 1308 outputs the motion vector map MV_MAP(p, q).

The interpolated image generation unit 1204 receives the input image data and the delayed image data from the frame memory unit 1200. The interpolated image generation unit 1204 receives the interpolation time ratio A and the interpolation scale factor B from the interpolation frame time setting unit 1201. In addition, the interpolated image generation unit 1204 receives the motion vector map MV_MAP(p, q), x-direction motion vector map size P, and y-direction motion vector map size Q from the motion vector detection unit 1203. The interpolated image generation unit 1204 uses these values to generate interpolated image data.

Figure 14:
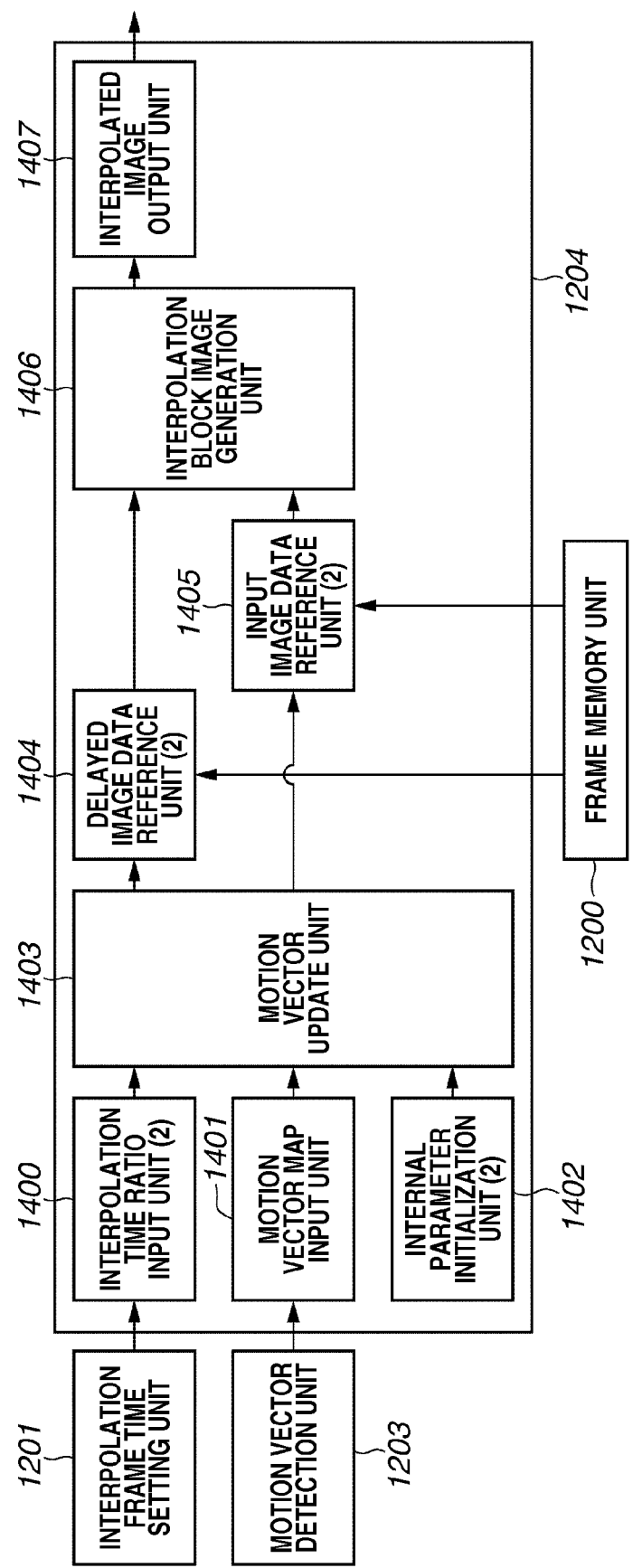
FIG. 14 is a diagram illustrating the configuration of an interpolated image generation unit.

FIG. 14 is a diagram illustrating the configuration of the interpolated image generation unit 1204. With reference to FIG. 14, the following describes the configuration of the interpolated image generation unit 1204.

The interpolated image generation unit 1204 includes an interpolation time ratio input unit (2) 1400, a motion vector map input unit 1401, an internal parameter initialization unit (2) 1402, a motion vector update unit 1403, a delayed image data reference unit (2) 1404, an input image data reference unit (2) 1405, an interpolation block image generation unit 1406, and an interpolated image output unit 1407.

The interpolation time ratio input unit (2) 1400 receives the interpolation time ratio A and the interpolation scale factor B from the interpolation frame time setting unit 1201. The motion vector map input unit 1401 receives the motion vector map MV_MAP(p, q), x-direction motion vector map size P, and y-direction motion vector map size Q from the motion vector detection unit 1203.

The internal parameter initialization unit (2) 1402 initializes the internal parameters used by the interpolated image generation unit 1204. In the present exemplary embodiment, the internal parameters are the x-direction motion vector map pointer p and y-direction motion vector map pointer q. These parameters are initialized to p=−1 and q=−1 respectively. The motion vector update unit 1403 acquires the motion vector MV($x_2$, $y_2$, $\Delta x1$, $\Delta y1$) from the motion vector map MV_MAP(p, q).

PQ pieces of motion vectors are mapped in the motion vector map MV_MAP(p, q). To reference these motion vectors individually, the motion vector update unit 1403 updates the x-direction motion vector map pointers p and the y-direction motion vector map pointers q sequentially as described below to acquire the motion vector MV($x_2$, $y_2$, $\Delta x1$, $\Delta y1$).

The motion vector update unit 1403 makes determination about a condition (3) and condition (4) as described below, to update s the x-direction motion vector map pointers p and the y-direction motion vector map pointers q. First, the motion vector update unit 1403 performs update processing (1) in which the y-direction motion vector map pointer q is updated according to q=q+1. After that, the motion vector update unit 1403 determines whether the y-direction motion vector map pointer q satisfies q<Q (condition (3)).

If the condition (3) is satisfied, the motion vector update unit 1403 performs update processing (2) in which the x-direction motion vector map pointer p is updated according to p=p+1. On the other hand, if the update condition (3) is not satisfied, the motion vector update unit 1403 transmits the control signal to the interpolated image output unit 1407. After the update processing (2), the motion vector update unit 1403 determines whether the x-direction motion vector map pointer p satisfies p<P (condition (4)). If the condition (4) is satisfied, the motion vector update unit 1403 acquires the motion vector MV ($x_2$, $y_2$, $\Delta x1$, $\Delta y1$)=MV_MAP(p, q). On the other hand, if the condition (4) is not satisfied, the motion vector update unit 1403 performs the update processing (1) again.

The delayed image data reference unit (2) 1404 references the delayed image data stored in the frame memory unit 1200, to acquire the block 503. More specifically, the delayed image data reference unit (2) 1404 uses the x-direction search motion vector $\Delta x0$ and the y-direction search motion vector $\Delta y0$ to calculate the coordinate values ($x_0$, $y_0$) of the delayed image search position 502 of the block 503 according to the expression (5) and acquires the block 503.

The input image data reference unit (2) 1405 references the input image data stored in the frame memory unit 1200, to acquire the block 505. More specifically, the input image data reference unit (2) 1405 uses the x-direction search motion vector $\Delta x0$ and the y-direction search motion vector $\Delta y0$ to calculate the coordinate values ($x_1$, $y_1$) of the input image search position 504 of the block 505 according to expression (6) and acquires the block 505.

The interpolation block image generation unit 1406 uses the block 503 and the block 505 to generate interpolated image data using the search reference position 500 at the coordinate values ($x_2$, $y_2$) as the reference according to the expression (7). In the expression (7), h(x, y) is the pixel value of the position indicated by the coordinate values (x, y) in the block 501. f(x, y) is the pixel value of the position indicated by the coordinate values (x, y) in the block 503. Also, g(x, y) is the pixel value of the position indicated by the coordinate values (x, y) in the block 505. m and n are offset values and their ranges are 0≤m<M and 0≤n<N. The interpolated image output unit 1407 receives the control signal from the motion vector update unit 1403 and outputs the interpolated image data generated by the interpolation block image generation unit 1406.

The image output unit 1205 receives the delayed image data from the frame memory unit 1200. The image output unit 1205 also receives the interpolated image data at A=1/3 and the interpolated image data at A=2/3 from the interpolated image generation unit 1204. The image output unit 1205 outputs these data in the order of the delayed image data, the interpolated image data at A=1/3, and the interpolated image data at A=2/3.

As described above, according to the second exemplary embodiment, any multiple-fold frame rate conversion can be performed, which is not achieved in the prior art, through the frame rate conversion processing based on the motion detection technology and the motion compensation technology.

In addition, motion vector search can be performed with an accuracy higher than the prior art, so that the image quality of interpolated image data generated through the motion compensation processing can be improved, and best video images can be provided to the user.

The present invention may be implemented by executing the following processing. More specifically, the software (program) that implements the function of the above-described exemplary embodiments is supplied to a system or an apparatus via a network or various types of non-transitory storage mediums to allow the computer (or CPU, Micro-Processing Unit (MPU), and/or the like) of the system or the apparatus to read the program for executing processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-103218 filed May 2, 2011, which is hereby incorporated by reference herein in its entirety.

What is claimed is:

1. An image processing apparatus capable of calculating a motion vector for generating interpolated image data between input image data and delayed image data at a third time based on input image data received at a first time and delayed image data received at a second time that is earlier than the first time by a predetermined frame time, the third time being earlier than the first time by a time shorter than the predetermined frame time, the image processing apparatus comprising:

a first acquisition unit configured to acquire a first block from the input image data and a second block from the delayed image data wherein, based on a reference position in the input image data corresponding to a reference position defined in the interpolated image data, the first block is at a position determined by multiplying a first time ratio by a first variable, the first time ratio being a value generated by dividing a first difference value by the predetermined frame time, the first difference value being a value generated by subtracting the third time from the first time, the first variable indicating a space deviation amount and wherein, based on a reference position in the delayed image data corresponding to the reference position defined in the interpolated image data, the second block is at a position determined by multiplying a second time ratio by the first variable, the second time ratio being a value generated by dividing a second difference value by the predetermined frame time, the second difference value being a value generated by subtracting the second time from the third time;

a first calculation unit configured to calculate a correlation between the first block and the second block acquired by the first acquisition unit; and a second calculation unit configured to calculate a motion vector in the interpolated image data based on the first variable determined when the first block and the second block, whose correlation calculated by the first calculation unit satisfies a predetermined condition, are acquired.

2. The image processing apparatus according to claim 1, further comprising:

an enlargement unit configured to enlarge the input image data and the delayed image data wherein the first acquisition unit acquires a first block from the input image data enlarged by the enlargement unit and acquires a second block from the delayed image data enlarged by the enlargement unit.

3. The image processing apparatus according to claim 2, wherein the enlargement unit enlarges the input image data and the delayed image data at a magnification corresponding to a number of pieces of the interpolated image data that are generated.

4. The image processing apparatus according to claim 1, further comprising:

a second acquisition unit configured to acquire a third block from the input image data and acquire a fourth block from the delayed image data with a second variable as a reference position, the second variable indicating a space deviation amount based on the first variable determined when the second calculation unit calculates the motion vector;

a third acquisition unit configured to calculate a correlation between a third block and a fourth block acquired by the second acquisition unit; and an update unit configured to update the motion vector based on the second variable determined when a third block and a fourth block, whose correlation calculated by the third calculation unit satisfies a predetermined condition, are acquired.

5. The image processing apparatus according to claim 1, wherein the correlation satisfying the predetermined condition is a correlation which is calculated by the first calculation unit and has the highest correlation.

6. The image processing apparatus according to claim 1, further comprising:

a generation unit configured to generate a seventh block in the interpolated image data based on a fifth block and a sixth block, wherein the fifth block is at a position determined by multiplying the motion vector by the first time ratio based on the reference position in the input image data and wherein the sixth block is at a position determined by multiplying the motion vector by the second time ratio based on the reference position in the delayed image data.

7. An image processing method performed by an image processing apparatus capable of calculating a motion vector for generating interpolated image data between input image data and delayed image data at a third time based on input image data received at a first time and delayed image data received at a second time that is earlier than the first time by a predetermined frame time, the third time being earlier than the first time by a time shorter than the predetermined frame time, the image processing method comprising:

acquiring a first block from the input image data and a second block from the delayed image data wherein, based on a reference position in the input image data corresponding to a reference position defined in the interpolated image data, the first block is at a position determined by multiplying a first time ratio by a first variable, the first time ratio being a value generated by dividing a first difference value by the predetermined frame time, the first difference value being a value generated by subtracting the third time from the first time, the first variable indicating a space deviation amount and wherein, based on a reference position in the delayed image data corresponding to the reference position defined in the interpolated image data, the second block is at a position determined by multiplying a second time ratio by the first variable, the second time ratio being a value generated by dividing a second difference value by the predetermined frame time, the second difference value being a value generated by subtracting the second time from the third time;

performing a first calculation to calculate a correlation between the first block and the second block acquired by the first acquisition unit; and performing a second calculation to calculate a motion vector in the interpolated image data based on the first variable determined when the first block and the second block, whose correlation calculated by the first calculation unit satisfies a predetermined condition, are acquired.

8. A non-transitory storage medium storing a program causing a computer to execute an image processing method performed by an image processing apparatus capable of calculating a motion vector for generating interpolated image data between input image data and delayed image data at a third time based on input image data received at a first time and delayed image data received at a second time that is earlier than the first time by a predetermined frame time, the third time being earlier than the first time by a time shorter than the predetermined frame time, the method comprising:

acquiring a first block from the input image data and a second block from the delayed image data wherein, based on a reference position in the input image data corresponding to a reference position defined in the interpolated image data, the first block is at a position determined by multiplying a first time ratio by a first variable, the first time ratio being a value generated by dividing a first difference value by the predetermined frame time, the first difference value being a value generated by subtracting the third time from the first time, the first variable indicating a space deviation amount and wherein, based on a reference position in the delayed image data corresponding to the reference position defined in the interpolated image data, the second block is at a position determined by multiplying a second time ratio by the first variable, the second time ratio being a value generated by dividing a second difference value by the predetermined frame time, the second difference value being a value generated by subtracting the second time from the third time;

performing a first calculation to calculate a correlation between the first block and the second block acquired by the first acquisition unit; and performing a second calculation to calculate a motion vector in the interpolated image data based on the first variable determined when the first block and the second block, whose correlation calculated by the first calculation unit satisfies a predetermined condition, are acquired.

\* \* \* \* \*